United States Patent
da Silva et al.

(10) Patent No.: US 12,452,747 B2
(45) Date of Patent: *Oct. 21, 2025

(54) METHOD FOR AVOIDING UNNECESSARY ACTIONS IN RESUME PROCEDURE

(71) Applicant: TELEFONAKTIEBOLAGET L M ERICSSON (PUBL), Stockholm (SE)

(72) Inventors: Icaro L. J. da Silva, Solna (SE); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,576

(22) Filed: Apr. 24, 2020

(65) Prior Publication Data

US 2020/0260348 A1 Aug. 13, 2020

Related U.S. Application Data

(63) Continuation of application No. 16/370,034, filed on Mar. 29, 2019, now Pat. No. 10,667,185, which is a
(Continued)

(51) Int. Cl.
*H04W 36/00* (2009.01)
*H04W 36/04* (2009.01)
(Continued)

(52) U.S. Cl.
CPC ....... *H04W 36/0079* (2018.08); *H04W 36/04* (2013.01); *H04W 48/20* (2013.01); *H04W 76/10* (2018.02)

(58) Field of Classification Search
CPC ............. H04W 36/0079; H04W 36/04; H04W 36/00837; H04W 76/10; H04W 36/0069
See application file for complete search history.

(56) References Cited

U.S. PATENT DOCUMENTS 8,543,100 B2 * 9/2013 Cheng ................... H04W 76/38
455/418
8,934,339 B2 1/2015 Suzuki et al.
(Continued)

FOREIGN PATENT DOCUMENTS

CA   2690017 A1 * 12/2008 ............ H04W 76/38
CN   101754312 B    5/2012
(Continued)

OTHER PUBLICATIONS

'Tech'away, RRC connection setup timers, Apr. 26, 2013, alltechstuffinoneplace.blogspot.com/2013/04/rrc-connection-setup-timers.html (Year: 2013).*
(Continued)

*Primary Examiner* — Mounir Moutaouakil
(74) *Attorney, Agent, or Firm* — Withrow & Terranova, PLLC

(57) ABSTRACT

A method for avoiding unnecessary actions in a connection establishment comprises sending a request to a network node to initiate the connection establishment, upon sending the request to the network node, starting a timer for the connection establishment, wherein an expiration of the timer stops the connection establishment for a user equipment (UE), and stopping the timer to stop the connection establishment upon the UE receiving a suspend message or a release message, or upon the UE performing a cell reselection procedure while the timer is running. The timer may prevent the UE from waiting the connection establishment to be completed if there is an error or bad transmission in the connection establishment. Furthermore, the timer to stop the connection establishment may avoid unnecessary actions and inform other layers in the network when the timer expires to stop the connection establishment.

12 Claims, 16 Drawing Sheets

Related U.S. Application Data continuation of application No. PCT/IB2019/051903, filed on Mar. 8, 2019.

(60) Provisional application No. 62/649,342, filed on Mar. 28, 2018.

(51) Int. Cl.
*H04W 48/20* (2009.01)
*H04W 76/10* (2018.01)

(56) References Cited

U.S. PATENT DOCUMENTS

| | | | |
|---|---|---|---|
| 10,863,394 B2* | 12/2020 | Kim | H04W 76/27 |
| 2011/0177813 A1* | 7/2011 | Uemura | H04W 76/18 |
| | | | 455/435.1 |
| 2011/0216732 A1* | 9/2011 | Maeda | H04W 8/02 |
| | | | 370/329 |
| 2011/0299429 A1* | 12/2011 | Tiwari | H04W 76/50 |
| | | | 370/259 |
| 2012/0063297 A1 | 3/2012 | Hong | |
| 2012/0082105 A1* | 4/2012 | Hwang | H04W 76/30 |
| | | | 370/329 |
| 2012/0178436 A1 | 7/2012 | Fan | |
| 2013/0090104 A1 | 4/2013 | Cheng et al. | |
| 2014/0198672 A1* | 7/2014 | Koo | H04W 72/1215 |
| | | | 370/252 |
| 2015/0055565 A1 | 2/2015 | Kotecha et al. | |
| 2015/0189689 A1* | 7/2015 | Wang | H04W 76/27 |
| | | | 370/329 |
| 2015/0237576 A1 | 8/2015 | Lee et al. | |
| 2015/0312960 A1 | 10/2015 | Kim et al. | |
| 2016/0050530 A1* | 2/2016 | Corbalis | H04W 12/02 |
| | | | 455/456.1 |
| 2016/0278160 A1* | 9/2016 | Schliwa-Bertling | |
| | | | H04W 72/048 |
| 2017/0034865 A1* | 2/2017 | Jung | H04W 76/18 |
| 2017/0048898 A1 | 2/2017 | Jung et al. | |
| 2017/0311375 A1* | 10/2017 | Jung | H04W 36/08 |
| 2017/0332436 A1 | 11/2017 | Chen | |
| 2018/0070402 A1 | 3/2018 | Chinthalapudi et al. | |
| 2018/0160422 A1* | 6/2018 | Pathak | H04W 72/0413 |
| 2018/0206080 A1* | 7/2018 | Chen | H04W 4/50 |
| 2018/0213575 A1* | 7/2018 | Chen | H04W 76/27 |
| 2018/0220486 A1* | 8/2018 | Tseng | H04W 36/305 |
| 2018/0249318 A1* | 8/2018 | Ianev | H04W 28/0215 |
| 2018/0270668 A1 | 9/2018 | Nair | |
| 2018/0324675 A1* | 11/2018 | Lee | H04W 48/02 |
| 2019/0208411 A1* | 7/2019 | Shrestha | H04L 9/0861 |
| 2019/0215885 A1 | 7/2019 | Wu | |
| 2019/0230737 A1* | 7/2019 | Fujishiro | H04W 88/023 |
| 2019/0306910 A1* | 10/2019 | Da Silva | H04W 76/28 |
| 2019/0335397 A1* | 10/2019 | Ganesan | H04W 52/0235 |
| 2019/0357065 A1* | 11/2019 | Cho | H04W 24/08 |
| 2020/0015074 A1* | 1/2020 | Kim | H04W 76/27 |
| 2020/0120741 A1* | 4/2020 | Lindheimer | H04W 60/04 |
| 2020/0236598 A1* | 7/2020 | Kim | H04W 36/0079 |
| 2020/0374960 A1* | 11/2020 | Deenoo | H04W 74/0833 |
| 2021/0022200 A1* | 1/2021 | Mildh | H04W 76/38 |
| 2021/0120618 A1* | 4/2021 | Lee | H04W 76/19 |
| 2021/0160953 A1* | 5/2021 | Mildh | H04W 76/38 |
| 2022/0104060 A1* | 3/2022 | Yang | H04W 36/36 |
| 2022/0159518 A1* | 5/2022 | Da Silva | H04W 36/08 |
| 2022/0182859 A1* | 6/2022 | Da Silva | H04W 52/0229 |

FOREIGN PATENT DOCUMENTS

| | | |
|---|---|---|
| CN | 106572544 A | 4/2017 |
| CN | 106954270 A | 7/2017 |
| CN | 107079514 A | 8/2017 |
| EP | 2645806 B1 | 7/2019 |
| RU | 2471312 C2 | 12/2012 |
| WO | 2013023975 A1 | 2/2013 |
| WO | 2013144614 A1 | 10/2013 |
| WO | 2016055099 A1 | 4/2016 |
| WO | 2016068776 A1 | 5/2016 |

OTHER PUBLICATIONS

Mediatek: "Minor corrections from review in preparation for ASN.1 freeze", 3GPP Draft; Draft 36331_CRXXXX_(REL-15)_R2-180XXXX on MI NOR CORRECTIONS-MTKV2, 3rd Generation Partnership Project . (3GPP), Mobilecompetence Centre , 650, Route Deslucio Les • F-06921 Sophia-Antipolis.

Intel Corporation: "TP on agreed NR Inactive aspects", 3GPP Draft; R2-1802929 NR Inactive TP-Intel, 3rd Generation-Partnership-Project (3GPP), Mobile Competence Centre ; 650, Route Des Lucioles , F-06921 Sophia-Antipolis Cedex , France.

Ericsson: "Handling of resume failure", 3GPP Draft; R2-1800422—Handling of Resume Failure, 3rd Generation Partnership Project (3GPP), Mobile Competence Centre; 650, Route Des Lucioles ; F-06921 Sophia-Antipolis Cedex ; France.

Ericsson: "Handling of suspend failure", 3GPP Draft; R2-1802592—Handling of Suspend Failure, 3rd Generation Partnership Project (3GPP), Mobile Competence Centre; 650, Route Des Lucioles ; F-06921 Sophia-Antipolis Cedex , France.

3GPP, "3rd Generation Partnership Project; Technical Specification Group Radio Access Network; NR; Radio Resource Control (RRC) protocol specification (Release 15)", TS 38.331 V15.4.0, Dec. 2018.

3rd Generation Partnership Project; Technical Specification Group Radio Access Network; Evolved Universal Terrestrial Radio Access IE-UTRA); Radio Resource Control (RRC); Protocol Specification (Release 15) 3GPP TS 36.331 V15.0.1, Jan. 9, 2018, pp. 65-81, 105-107, 682-684.

CATT, "RRC Release procedure in NR", R2-1704231, 3GPP TSG-RAN WG2 Meeting #98, Hangzhou, China, May 15-19, 2017.

Ericsson, "Connected to Inactive state transition", 3GPP TSG RAN WG2 #98, R2-1704119 (revision of R2-1702811), Hangzhou, P.R. of China, May 15-19, 2017.

Huawei, Hisilicon, Qualcomm Incorporated, "Introduction of EDT for eMTC and NB-IoT enhancements", Change Request 36.331, current version 15.0.1, R2-1803443, 3GPP TSG-RAN2 Meeting #101, Athens, Greece, Feb. 26-Mar. 2, 2018.

Intel Corporation, "Resume failure handling in inactive", 3GPP RSG RAN WG2# 101 R2-1802930, Feb. 16, 2018.

Media Tek, "Minor corrections from review in preparation for ASN. 1 freeze", R2-180XXXX, Change request 36.331, current version 15.0.0, 3GPP TSG-RAN2 Meeting AH-1801, Vancouver, Canada, Jan. 22-26, 2018.

Ericsson, "Handling of resume failure", R2-1802593 (Resubmission of R2-1800422), 3GPP TSG-RAN WG2 #101, Athens, Greece, Feb. 26-Mar. 2, 2018.

Huawei, "(TP for BL CR for TS 38.300): RNA update procedure update", R3-185615, 3GPP TSG-RAN WG3 #101bis, Chengdu, China, Oct. 8-12, 2018.

Huawei et al., "Remaining issues for EDT in the UP solution for eMTC and NB-IoT (online)", 3GPP TSG RAN WG2 #100 R2-1713185, 3GPP, Dec. 1, 2017.

First Office Action for Chinese Patent Application No. 201980021256. 1, mailed Jan. 26, 2022, 12 pages.

Second Office Action for Chinese Patent Application No. 201980021256. 1, mailed Aug. 3, 2022, 11 pages.

Examination Report for European Patent Application No. 19718448. 4, mailed Apr. 26, 2022, 5 pages.

Examination Report for European Patent Application No. 19718448. 4, mailed May 4, 2023, 5 pages.

Intention to Grant for European Patent Application No. 19718448.4, mailed Dec. 11, 2023, 8 pages.

Extended European Search Report for European Patent Application No. 24172849.2, mailed Nov. 12, 2024, 4 pages.

Notice of Reasons for Refusal for Japanese Patent Application No. 2020-551339, mailed Nov. 24, 2021, 9 pages.

Notice of Reasons for Refusal for Japanese Patent Application No. 2022-066080, mailed Apr. 25, 2023, 6 pages.

(56) References Cited

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.0.0, Dec. 2017, 3GPP Organizational Partners, 776 pages.
First Office Action for Chinese Patent Application No. 202310281125.5, mailed Aug. 9, 2025, 14 pages.
Examination Report for European Patent Application No. 24172849.2, mailed Aug. 25, 2025, 5 pages.

* cited by examiner

METHOD FOR AVOIDING UNNECESSARY ACTIONS IN RESUME PROCEDURE

RELATED APPLICATIONS

This application is a continuation of co-pending U.S. patent application Ser. No. 16/370,034 filed on Mar. 29, 2019, which is a Continuation of International Patent Application PCT/IB2019/051903, filed Mar. 8, 2019, which claims the benefit of U.S. Provisional Application No. 62/649,342, filed Mar. 28, 2018 and entitled "Failure Timer Handling for Connection Resume and Establishment," the disclosures of which are all hereby incorporated by reference.

TECHNICAL FIELD

Particular embodiments relate to the field of avoiding unnecessary actions for a user equipment; and more specifically, to methods, and apparatus for avoiding unnecessary action for the user equipment in the resume procedure in the 5G generation radio.

BACKGROUND

Radio resource control (RRC) connection resume procedure in LTE requires a suspension mechanism to stop the procedure properly. In LTE Rel-13, a mechanism was introduced for a user equipment (UE) to be suspended by the network in a suspended state similar to RRC_IDLE, but with the difference that the UE stores the Access Stratum (AS) context or RRC context. This makes it possible to reduce the signaling when the UE is becoming active again by resuming the RRC connection, instead of having to establish the RRC connection from scratch, as had previously been done. Reducing the signaling could have several benefits, such reduce latency, e.g. for smart phones accessing internet, and reduced signaling leads to reduced battery consumption for machine type devices sending very little data.

The Rel-13 solution is based on that the UE sends an RRCConnectionResumeRequest message to the network and, in response, receives an RRCConnectionResume from the network. The RRCConnectionResume is not encrypted but is integrity protected.

In LTE Rel-13 and RRC_INACTIVE in NR, as part of the standardized work on 5G NR in 3GPP, it has been decided that NR should support an RRC_INACTIVE state with similar properties as the suspended state in LTE Rel-13. The RRC_INACTIVE has slightly different properties from the late state in that it is a separate RRC state and not part of RRC_IDLE as in LTE. Additionally, the core network (CN)/radio access network (RAN) connection using next generation (NG) or N2 interface is kept for RRC_INACTIVE while it was suspended in LTE.

FIG. 1 illustrates example state transitions between in NR. The properties of the RRC_IDLE comprises a UE specific discontinuous reception (DRX) configured by upper layers, the UE controlled mobility based on network configuration, the UE monitoring a paging channel for CN paging using 5G-S-TMSI, e.g. 5G System Architecture Evolution (SAE)-Temporary Mobile Subscriber Identity, the UE performing neighboring cell measurements, cell selection, and cell reselection, and the UE acquiring system information. The properties of the RRC_INACTIVE comprises a UE specific DRX configured by upper layers or by RRC layer, the UE controlled mobility based on network configuration, the UE storing the AS context, the UE monitoring a paging channel for CN paging using 5G-S-TMSI and RAN paging using I-RNTI, e.g. Inactive Radio Network Temporary Identifier, performing neighboring cell measurements, cell selection and cell reselection, performing RAN-based notification area updates periodically when moving outside the RAN-based notification area, and acquiring system information. The properties of the RRC_CONNECTED comprises the UE storing the AS context, transferring of unicast data to/from UE, the UE configured with a UE specific DRX at lower layers, using one or more secondary cells (SCells) for the UEs supporting carrier aggregation aggregated with the secondary primary cell (SpCell) for increased bandwidth, using secondary cell group (SCG) for the UEs supporting dual connectivity (DC) aggregated with the master cell group (MCG) for increased bandwidth, network controlled mobility, i.e. handover within NR and to/from E-UTRAN. In addition, the properties of the RRC_CONNECTED comprises the UE monitoring a paging channel, monitoring control channels associated with the shared data channel to determine if data is scheduled for it, providing channel quality and feedback information, performing neighboring cell measurements and measurement reporting, and acquiring system information.

In LTE, the current mechanism is that the UE verifies messages from the network prior to start of encryption. Today in LTE, there are some messages sent from the network to UE which are used to start or resume the encryption of RRC signaling. These messages are integrity protected but not encrypted. Below are some excerpts from 3GPP LTE RRC specification TS 36.331 v15.0.0 showing how the UE on RRC level verifies the integrity of these messages. As can be seen from all of the cases, the UE RRC will upon reception of the message ask lower layer, e.g. packet data convergence protocol (PDCP), to verify the integrity of the message. If the message is verified the UE RRC layer configures the lower layers to apply ciphering and integrity protection of all subsequent messages.

FIGS. 2 and 3 illustrate example resume procedure failure due to bad downlink/uplink radio conditions. Regarding T300 failure handling in LTE, there is a failure timer, T300, which is started when the UE is performing the establishment or resume procedure. The purpose of the failure timer is to stop the procedure if the UE does not get any valid response from the network. For example, the UE not getting any valid response could have occurred due to downlink problems in receiving a response message or even due to uplink problems. This will prevent the UE from getting stuck waiting for a message from the network that never comes. The timer, T300, is then either stopped when the UE receives a valid message, or it times out. In the latter case, the UE performs certain actions and informs upper layers.

The following excerpts from 3GPP TS 36.331 provide additional context. The UE initiates the procedure when upper layers request establishment or resume of an RRC connection while the UE is in RRC_IDLE. Except for NB-IoT, upon initiation of the procedure, the UE shall:

1> if SystemInformationBlockType2 includes ac-BarringPerPLMN-List and the ac-BarringPerPLMN-List contains an AC-BarringPerPLMN entry with the plmn-IdentityIndex corresponding to the PLMN selected by upper layers (see TS 23.122 [11], TS 24.301 [35]):
    2> select the AC-BarringPerPLMN entry with the plmn-IdentityIndex corresponding to the PLMN selected by upper layers;
    2> in the remainder of this procedure, use the selected AC-BarringPerPLMN entry (i.e. presence or absence of access barring parameters in this entry) irrespective of the common access barring parameters included in SystemInformationBlockType2;
1> else
  2> in the remainder of this procedure use the common access barring parameters (i.e. presence or absence of these parameters) included in SystemInformationBlockType2;
1> if SystemInformationBlockType2 contains acdc-BarringPerPLMN-List and the acdc-BarringPerPLMN-List contains an ACDC-BarringPerPLMN entry with the plmn-IdentityIndex corresponding to the PLMN selected by upper layers (see TS 23.122 [11], TS 24.301 [35]):
  2> select the ACDC-BarringPerPLMN entry with the plmn-IdentityIndex corresponding to the PLMN selected by upper layers;
  2> in the remainder of this procedure, use the selected ACDC-BarringPerPLMN entry for ACDC barring check (i.e. presence or absence of access barring parameters in this entry) irrespective of the acdc-BarringForCommon parameters included in SystemInformationBlockType2;
1> else:
  2> in the remainder of this procedure use the acdc-BarringForCommon (i.e. presence or absence of these parameters) included in SystemInformationBlockType2 for ACDC barring check;
1> if upper layers indicate that the RRC connection is subject to EAB (see TS 24.301 [35]):
  2> if the result of the EAB check, as specified in 5.3.3.12, is that access to the cell is barred:
    3> inform upper layers about the failure to establish the RRC connection or failure to resume the RRC connection with suspend indication and that EAB is applicable, upon which the procedure ends;
1> if upper layers indicate that the RRC connection is subject to ACDC (see TS 24.301 [35]), SystemInformationBlockType2 contains BarringPerACDC-CategoryList, and acdc-HPLMNonly indicates that ACDC is applicable for the UE:
  2> if the BarringPerACDC-CategoryList contains a BarringPerACDC-Category entry corresponding to the ACDC category selected by upper layers:
    3> select the BarringPerACDC-Category entry corresponding to the ACDC category selected by upper layers;
  2> else:
    3> select the last BarringPerACDC-Category entry in the BarringPerACDC-CategoryList;
  2> stop timer T308, if running;
  2> perform access barring check as specified in 5.3.3.13, using T308 as "Tbarring" and acdc-BarringConfig in the BarringPerACDC-Category as "ACDC barring parameter";
  2> if access to the cell is barred:
    3> inform upper layers about the failure to establish the RRC connection or failure to resume the RRC connection with suspend indication and that access barring is applicable due to ACDC, upon which the procedure ends;
1> else if the UE is establishing the RRC connection for mobile terminating calls:
  2> if timer T302 is running:
    3> inform upper layers about the failure to establish the RRC connection or failure to resume the RRC connection with suspend indication and that access barring for mobile terminating calls is applicable, upon which the procedure ends;
1> else if the UE is establishing the RRC connection for emergency calls:
  2> if SystemInformationBlockType2 includes the ac-BarringInfo:
    3> if the ac-BarringForEmergency is set to TRUE:
      4> if the UE has one or more Access Classes, as stored on the USIM, with a value in the range 11 . . . 15, which is valid for the UE to use according to TS 22.011 [10] and TS 23.122 [11]:
        NOTE 1: ACs 12, 13, 14 are only valid for use in the home country and ACs 11, 15 are only valid for use in the HPLMN/EHPLMN.
        5> if the ac-BarringInfo includes ac-BarringForMO-Data, and for all of these valid Access Classes for the UE, the corresponding bit in the ac-BarringForSpecialAC contained in ac-BarringForMO-Data is set to one:
          6> consider access to the cell as barred;
      4> else:
        5> consider access to the cell as barred;
  2> if access to the cell is barred:
    3> inform upper layers about the failure to establish the RRC connection or failure to resume the RRC connection with suspend indication, upon which the procedure ends;
1> else if the UE is establishing the RRC connection for mobile originating calls:
  2> perform access barring check as specified in 5.3.3.11, using T303 as "Tbarring" and ac-BarringForMO-Data as "AC barring parameter";
  2> if access to the cell is barred:
    3> if SystemInformationBlockType2 includes ac-BarringForCSFB or the UE does not support CS fallback:
      4> inform upper layers about the failure to establish the RRC connection or failure to resume the RRC connection with suspend indication and that access barring for mobile originating calls is applicable, upon which the procedure ends;
    3> else (SystemInformationBlockType2 does not include ac-BarringForCSFB and the UE supports CS fallback):
      4> if timer T306 is not running, start T306 with the timer value of T303;
      4> inform upper layers about the failure to establish the RRC connection or failure to resume the RRC connection with suspend indication and that access barring for mobile originating calls and mobile originating CS fallback is applicable, upon which the procedure ends;
1> else if the UE is establishing the RRC connection for mobile originating signalling:
  2> perform access barring check as specified in 5.3.3.11, using T305 as "Tbarring" and ac-BarringForMO-Signalling as "AC barring parameter";
  2> if access to the cell is barred:
    3> inform upper layers about the failure to establish the RRC connection or failure to resume the RRC connection with suspend indication and that access barring for mobile originating signalling is applicable, upon which the procedure ends;
1> else if the UE is establishing the RRC connection for mobile originating CS fallback:

2> if SystemInformationBlockType2 includes ac-BarringForCSFB:
   3> perform access barring check as specified in 5.3.3.11, using T306 as "Tbarring" and ac-BarringForCSFB as "AC barring parameter";
   3> if access to the cell is barred:
      4> inform upper layers about the failure to establish the RRC connection or failure to resume the RRC connection with suspend indication and that access barring for mobile originating CS fallback is applicable, due to ac-BarringForCSFB, upon which the procedure ends;
2> else:
   3> perform access barring check as specified in 5.3.3.11, using T306 as "Tbarring" and ac-BarringForMO-Data as "AC barring parameter";
   3> if access to the cell is barred:
      4> if timer T303 is not running, start T303 with the timer value of T306;
      4> inform upper layers about the failure to establish the RRC connection or failure to resume the RRC connection with suspend indication and that access barring for mobile originating CS fallback and mobile originating calls is applicable, due to ac-BarringForMO-Data, upon which the procedure ends;
1> else if the UE is establishing the RRC connection for mobile originating MMTEL voice, mobile originating MMTEL video, mobile originating SMSoIP or mobile originating SMS:
   2> if the UE is establishing the RRC connection for mobile originating MMTEL voice and SystemInformationBlockType2 includes ac-BarringSkipForMMTELVoice; or
   2> if the UE is establishing the RRC connection for mobile originating MMTEL video and SystemInformationBlockType2 includes ac-BarringSkipForWTELVideo; or
   2> if the UE is establishing the RRC connection for mobile originating SMSoIP or SMS and SystemInformationBlockType2 includes ac-BarringSkipForSMS:
      3> consider access to the cell as not barred;
   2> else:
      3> if establishmentCause received from higher layers is set to mo-Signalling (including the case that mo-Signalling is replaced by highPriorityAccess according to 3GPP TS 24.301 [35] or by mo-VoiceCall according to the subclause 5.3.3.3):
         4> perform access barring check as specified in 5.3.3.11, using T305 as "Tbarring" and ac-BarringForMO-Signalling as "AC barring parameter";
         4> if access to the cell is barred:
            5> inform upper layers about the failure to establish the RRC connection or failure to resume the RRC connection with suspend indication and that access barring for mobile originating signalling is applicable, upon which the procedure ends;
      3> if establishmentCause received from higher layers is set to mo-Data (including the case that mo-Data is replaced by highPriorityAccess according to 3GPP TS 24.301 [35] or by mo-VoiceCall according to the subclause 5.3.3.3):
         4> perform access barring check as specified in 5.3.3.11, using T303 as "Tbarring" and ac-BarringForMO-Data as "AC barring parameter";
         4> if access to the cell is barred:
            5> if SystemInformationBlockType2 includes ac-BarringForCSFB or the UE does not support CS fallback:
               6> inform upper layers about the failure to establish the RRC connection or failure to resume the RRC connection with suspend indication and that access barring for mobile originating calls is applicable, upon which the procedure ends;
            5> else (SystemInformationBlockType2 does not include ac-BarringForCSFB and the UE supports CS fallback):
               6> if timer T306 is not running, start T306 with the timer value of T303;
               6> inform upper layers about the failure to establish the RRC connection or failure to resume the RRC connection with suspend indication and that access barring for mobile originating calls and mobile originating CS fallback is applicable, upon which the procedure ends;
1> if the UE is resuming an RRC connection:
   2> release the MCG SCell(s), if configured, in accordance with 5.3.10.3a;
   2> release powerPrefIndicationConfig, if configured and stop timer T340, if running;
   2> release reportProximityConfig and clear any associated proximity status reporting timer;
   2> release obtainLocationConfig, if configured;
   2> release idc-Config, if configured;
   2> release measSubframePatternPCell, if configured;
   2> release the entire SCG configuration, if configured, except for the DRB configuration (as configured by drb-ToAddModListSCG);
   2> release naics-Info for the PCell, if configured;
   2> release the LWA configuration, if configured, as described in 5.6.14.3;
   2> release the LWIP configuration, if configured, as described in 5.6.17.3;
   2> release bw-PreferenceIndicationTimer, if configured and stop timer T341, if running;
   2> release delayBudgetReportingConfig, if configured and stop timer T342, if running;
1> apply the default physical channel configuration as specified in 9.2.4;
1> apply the default semi-persistent scheduling configuration as specified in 9.2.3;
1> apply the default MAC main configuration as specified in 9.2.2;
1> apply the CCCH configuration as specified in 9.1.1.2;
1> apply the timeAlignmentTimerCommon included in SystemInformationBlockType2;
1> start timer T300;
1> if the UE is resuming an RRC connection:
   2> initiate transmission of the RRCConnectionResumeRequest message in accordance with 5.3.3.3a;
1> else:
   2> if stored, discard the UE AS context and resumeIdentity;
   2> initiate transmission of the RRCConnectionRequest message in accordance with 5.3.3.3;
NOTE 2: Upon initiating the connection establishment procedure, the UE is not required to ensure it maintains up to date system information applicable only for UEs in RRC_IDLE state. However, the UE needs to perform system information acquisition upon cell reselection.

In the other hand, for NB-IoT, upon initiation of the procedure, the UE shall perform the following actions according to 3GPP TS 36.331:

1> if the UE is establishing or resuming the RRC connection for mobile originating exception data; or
1> if the UE is establishing or resuming the RRC connection for mobile originating data; or
1> if the UE is establishing or resuming the RRC connection for delay tolerant access; or
1> if the UE is establishing or resuming the RRC connection for mobile originating signalling;
   2> perform access barring check as specified in 5.3.3.14;
   2> if access to the cell is barred:
      3> inform upper layers about the failure to establish the RRC connection or failure to resume the RRC connection with suspend indication and that access barring is applicable, upon which the procedure ends;
1> apply the default physical channel configuration as specified in 9.2.4;
1> apply the default MAC main configuration as specified in 9.2.2;
1> apply the CCCH configuration as specified in 9.1.1.2;
1> start timer T300;
1> if the UE is establishing an RRC connection:
   2> initiate transmission of the RRCConnectionRequest message in accordance with 5.3.3.3;
1> else if the UE is resuming an RRC connection:
   2> initiate transmission of the RRCConnectionResumeRequest message in accordance with 5.3.3.3a;

NOTE 3: Upon initiating the connection establishment or resumption procedure, the UE is not required to ensure it maintains up to date system information applicable only for UEs in RRC_IDLE state. However, the UE needs to perform system information acquisition upon cell reselection.

Prior to this, lower layer signaling is used to allocate a C-RNTI. The following excerpts from 3GPP TS 36.321[6] provides additional context. When the UE receives the RRCConnectionSetup message, the UE shall:

1> if the RRCConnectionSetup is received in response to an RRCConnectionResumeRequest:
   2> discard the stored UE AS context and resumeIdentity;
   2> indicate to upper layers that the RRC connection resume has been fallbacked;
1> perform the radio resource configuration procedure in accordance with the received radioResourceConfigDedicated and as specified in 5.3.10;
1> if stored, discard the cell reselection priority information provided by the idleModeMobilityControlInfo or inherited from another RAT;
1> if stored, discard the dedicated offset provided by the redirectedCarrierOffsetDedicated;
1> stop timer T300;
1> stop timer T302, if running;
1> stop timer T303, if running;
1> stop timer T305, if running;
1> stop timer T306, if running;
1> stop timer T308, if running;
1> perform the actions as specified in 5.3.3.7;
1> stop timer T320, if running;
1> stop timer T350, if running;
1> perform the actions as specified in 5.6.12.4;
1> release rclwi-Configuration, if configured, as specified in 5.6.16.2;
1> stop timer T360, if running;
1> stop timer T322, if running;
1> enter RRC_CONNECTED;
1> stop the cell reselection procedure;
1> consider the current cell to be the PCell;
1> set the content of RRCConnectionSetupComplete message as follows:
   2> if the RRCConnectionSetup is received in response to an RRCConnectionResumeRequest:
      3> if upper layers provide an S-TMSI:
         4> set the s-TMSI to the value received from upper layers;
   2> set the selectedPLMN-Identity to the PLMN selected by upper layers (see TS 23.122 [11], TS 24.301 [35]) from the PLMN(s) included in the plmn-IdentityList in SystemInformationBlockType1 (or SystemInformationBlockType1-NB in NB-IoT);
   2> if upper layers provide the 'Registered MME', include and set the registeredMME as follows:
      3> if the PLMN identity of the 'Registered MME' is different from the PLMN selected by the upper layers:
         4> include the plmnIdentity in the registeredMME and set it to the value of the PLMN identity in the 'Registered MME' received from upper layers;
      3> set the mmegi and the mmec to the value received from upper layers;
   2> if upper layers provided the 'Registered MME':
      3> include and set the gummei-Type to the value provided by the upper layers;
   2> if the UE supports CIoT EPS optimisation(s):
      3> include attachWithoutPDN-Connectivity if received from upper layers;
      3> include up-CIoT-EPS-Optimisation if received from upper layers;
      3> except for NB-IoT, include cp-CIoT-EPS-Optimisation if received from upper layers;
   2> if connecting as an RN:
      3> include the rn-SubframeConfigReq;
   2> set the dedicatedInfoNAS to include the information received from upper layers;
   2> except for NB-IoT:
      3> if the UE has radio link failure or handover failure information available in VarRLF-Report and if the RPLMN is included in plmn-IdentityList stored in VarRLF-Report:
         4> include rlf-InfoAvailable;
      3> if the UE has MBSFN logged measurements available for E-UTRA and if the RPLMN is included in plmn-IdentityList stored in VarLogMeasReport:
         4> include logMeasAvailableMBSFN;
      3> else if the UE has logged measurements available for E-UTRA and if the RPLMN is included in plmn-IdentityList stored in VarLogMeasReport:
         4> include logMeasAvailable;

3> if the UE has connection establishment failure information available in VarConnEstFailReport and if the RPLMN is equal to plmn-Identity stored in VarConnEstFailReport:
    4> include connEstFailInfoAvailable;
3> include the mobilityState and set it to the mobility state (as specified in TS 36.304 [4]) of the UE just prior to entering RRC_CONNECTED state;
3> if the UE supports storage of mobility history information and the UE has mobility history information available in VarMobilityHistoryReport:
    4> include the mobilityHistoryAvail;
2> include dcn-ID if a DCN-ID value (see TS 23.401 [41]) is received from upper layers;
2> if UE needs UL gaps during continuous uplink transmission:
    3> include ue-CE-NeedULGaps;
2> submit the RRCConnectionSetupComplete message to lower layers for transmission, upon which the procedure ends;

Following the above scenario of lower signaling being used to allocate a C-RNTI, when the UE receives the RRCConnectionResume message, the UE shall:

1> stop timer T300;
1> restore the PDCP state and re-establish PDCP entities for SRB2 and all DRBs;
1> if drb-ContinueROHC is included:
    2> indicate to lower layers that stored UE AS context is used and that drb-ContinueROHC is configured;
    2> continue the header compression protocol context for the DRBs configured with the header compression protocol;
1> else:
    2> indicate to lower layers that stored UE AS context is used;
    2> reset the header compression protocol context for the DRBs configured with the header compression protocol;
1> discard the stored UE AS context and resumeIdentity;
1> perform the radio resource configuration procedure in accordance with the received radioResourceConfigDedicated and as specified in 5.3.10;
1> if the received RRCConnectionResume message includes the sk-Counter:
    2> perform key update procedure as specified in TS 38.331 [82, 5.3.5.7];
1> if the received RRCConnectionResume message includes the nr-RadioBearerConfig:
    2> perform radio bearer configuration as specified in TS 38.331 [82, 5.3.5.5];
1> if the received RRCConnectionResume message includes the nr-RadioBearerConfigS:
    2> perform radio bearer configuration as specified in TS 38.331 [82, 5.3.5.5];
1> resume SRB2 and all DRBs;
1> if stored, discard the cell reselection priority information provided by the idleModeMobilityControlInfo or inherited from another RAT;
1> if stored, discard the dedicated offset provided by the redirectedCarrierOffsetDedicated;
1> if the RRCConnectionResume message includes the measConfig:
    2> perform the measurement configuration procedure as specified in 5.5.2;
1> stop timer T302, if running;
1> stop timer T303, if running;
1> stop timer T305, if running;
1> stop timer T306, if running;
1> stop timer T308, if running;
1> perform the actions as specified in 5.3.3.7;
1> stop timer T320, if running;
1> stop timer T350, if running;
1> perform the actions as specified in 5.6.12.4;
1> stop timer T360, if running;
1> stop timer T322, if running;
1> update the $K_{eNB}$ key based on the $K_{ASME}$ key to which the current $K_{eNB}$ is associated, using the nextHopChainingCount value indicated in the RRCConnectionResume message, as specified in TS 33.401 [32];
1> store the nextHopChainingCount value;
1> derive the $K_{RRCint}$ key associated with the previously configured integrity algorithm, as specified in TS 33.401 [32];
1> request lower layers to verify the integrity protection of the RRCConnectionResume message, using the previously configured algorithm and the $K_{RRCint}$ key;
1> if the integrity protection check of the RRCConnectionResume message fails:
    2> perform the actions upon leaving RRC_CONNECTED as specified in 5.3.12, with release cause 'other', upon which the procedure ends;
1> derive the $K_{RRCenc}$ key and the $K_{UPenc}$ key associated with the previously configured ciphering algorithm, as specified in TS 33.401 [32];
1> configure lower layers to resume integrity protection using the previously configured algorithm and the $K_{RRCint}$ key immediately, i.e., integrity protection shall be applied to all subsequent messages received and sent by the UE;
1> configure lower layers to resume ciphering and to apply the ciphering algorithm, the $K_{RRCenc}$ key and the $K_{UPenc}$ key, i.e. the ciphering configuration shall be applied to all subsequent messages received and sent by the UE;
1> enter RRC_CONNECTED;
1> indicate to upper layers that the suspended RRC connection has been resumed;
1> stop the cell reselection procedure;
1> consider the current cell to be the PCell;
1> set the content of RRCConnectionResumeComplete message as follows:
    2> set the selectedPLMN-Identity to the PLMN selected by upper layers (see TS 23.122 [11], TS 24.301 [35]) from the PLMN(s) included in the plmn-IdentityList in SystemInformationBlockType1;
    2> set the dedicatedInfoNAS to include the information received from upper layers;
    2> except for NB-IoT:
        3> if the UE has radio link failure or handover failure information available in VarRLF-Report and if the RPLMN is included in plmn-IdentityList stored in VarRLF-Report:
            4> include rlf-InfoAvailable;
        3> if the UE has MBSFN logged measurements available for E-UTRA and if the RPLMN is included in plmn-IdentityList stored in VarLogMeasReport:
            4> include logMeasAvailableMBSFN;
        3> else if the UE has logged measurements available for E-UTRA and if the RPLMN is included in plmn-IdentityList stored in VarLogMeasReport:
            4> include logMeasAvailable;

3> if the UE has connection establishment failure information available in VarConnEstFailReport and if the RPLMN is equal to plmn-Identity stored in VarConnEstFailReport:
 4> include connEstFailInfoAvailable;
3> include the mobilityState and set it to the mobility state (as specified in TS 36.304 [4]) of the UE just prior to entering RRC_CONNECTED state;
3> if the UE supports storage of mobility history information and the UE has mobility history information available in VarMobilityHistoryReport:
 4> include mobilityHistoryAvail;
1> submit the RRCConnectionResumeComplete message to lower layers for transmission;
1> the procedure ends.

When the resume procedure upon an T300 expiry, the UE shall:
1> if timer T300 expires:
 2> reset MAC, release the MAC configuration and re-establish RLC for all RBs that are established;
 2> if the UE is a NB-IoT UE:
  3> if connEstFailOffset is included in SystemInformationBlockType2-NB:
   4> use connEstFailOffset for the parameter $Qoffset_{temp}$ for the concerned cell when performing cell selection and reselection according to TS 36.304 [4];
  3> else:
   4> use value of infinity for the parameter $Qoffset_{temp}$ for the concerned cell when performing cell selection and reselection according to TS 36.304 [4];
NOTE 0: For NB-IoT, the number of times that the UE detects T300 expiry on the same cell before applying connEstFailOffset and the amount of time that the UE applies connEstFailOffset before removing the offset from evaluation of the cell is up to UE implementation.
 2> else if the UE supports RRC Connection Establishment failure temporary Qoffset and T300 has expired a consecutive connEstFailCount times on the same cell for which txFailParams is included in SystemInformationBlockType2:
  3> for a period as indicated by connEstFailOffsetValidity:
   4> use connEstFailOffset for the parameter $Qoffset_{temp}$ for the concerned cell when performing cell selection and reselection according to TS 36.304 [4] and TS 25.304 [40];
NOTE 1: When performing cell selection, if no suitable or acceptable cell can be found, it is up to UE implementation whether to stop using connEstFailOffset for the parameter $Qoffset_{temp}$ during connEstFailOffsetValidity for the concerned cell.
 2> except for NB-IoT, store the following connection establishment failure information in the VarConnEstFailReport by setting its fields as follows:
  3> clear the information included in VarConnEstFailReport, if any;
  3> set the plmn-Identity to the PLMN selected by upper layers (see TS 23.122 [11], TS 24.301 [35]) from the PLMN(s) included in the plmn-IdentityList in SystemInformationBlockType1;
  3> set the failedCellId to the global cell identity of the cell where connection establishment failure is detected;
  3> set the measResultFailedCell to include the RSRP and RSRQ, if available, of the cell where connection establishment failure is detected and based on measurements collected up to the moment the UE detected the failure;
  3> if available, set the measResultNeighCells, in order of decreasing ranking-criterion as used for cell reselection, to include neighbouring cell measurements for at most the following number of neighbouring cells: 6 intra-frequency and 3 inter-frequency neighbours per frequency as well as 3 inter-RAT neighbours, per frequency/set of frequencies (GERAN) per RAT and according to the following:
   4> for each neighbour cell included, include the optional fields that are available;
NOTE 2: The UE includes the latest results of the available measurements as used for cell reselection evaluation, which are performed in accordance with the performance requirements as specified in TS 36.133 [16].
  3> if detailed location information is available, set the content of the locationInfo as follows:
   4> include the locationCoordinates;
   4> include the horizontal Velocity, if available;
  3> set the numberOfPreamblesSent to indicate the number of preambles sent by MAC for the failed random access procedure;
  3> set contentionDetected to indicate whether contention resolution was not successful as specified in TS 36.321 [6] for at least one of the transmitted preambles for the failed random access procedure;
  3> set maxTxPowerReached to indicate whether or not the maximum power level was used for the last transmitted preamble, see TS 36.321 [6];
 2> inform upper layers about the failure to establish the RRC connection or failure to resume the RRC connection with suspend indication, upon which the procedure ends.

The UE may discard the connection establishment failure information, i.e. release the UE variable VarConnEstFailReport, 48 hours after the failure is detected, upon power off or upon detach.

There currently exist certain challenges. It has been agreed in NR that the UE should start a timer similar to T300 when Resuming the RRC connection, i.e. transitioning from RRC_INACTIVE state to RRC_CONNECTED. It has not been agreed if this timer is the same timer as used when the UE is performing an RRC connection establishment, i.e. transitioning from RRC_IDLE to RRC_CONNECTED.

Additionally, the following aspects has been agreed for NR RRC which is different from LTE RRC.

Firstly, in NR RRC, the resume message to resume the connection which the network may send in response to the UE which are trying to resume the connection will be encrypted. This is different from the current LTE specification where the corresponding RRCConnectionResume message is not encrypted.

Secondly, FIG. 4 illustrates an example RRCSuspend message in the resume procedure in NR. In NR RRC, the network may respond to a ResumeRequest from the UE with a suspend message which immediately orders the UE back to RRC_INACTIVE state. Also, this message will be encrypted. In LTE, it is not possible to send a suspend message directly to the UE trying to resume the connection.

Lastly, FIG. 5 illustrates an example RRCRelease message in the resume procedure in NR. In NR RRC, the network may respond to a ResumeRequest from the UE with a release message which immediately orders the UE back to RRC_IDLE state. Also, this message will be encrypted. In LTE it is not possible to send a release message directly to the UE trying to resume the connection.

Due to the differences above, the following issues occurs with handling the timer for NR RRC resume.

Firstly, since in all cases above the message the UE receives in response is encrypted, it is not possible to read the message in case the UE is not able to decode the message, so for this reason it is not possible to stop the timer in this case. This case could for instance occur if the network and UE has lost synchronization, e.g. network and UE does not agree in which state the UE is in.

Secondly, since the UE may receive more messages in NR in response to the ResumeRequest it is not enough to just stop the timer when receiving the resume message as in LTE, since it would continue to run if the network does not answer with the resume message.

Lastly, in both cases above, the timer will continue to run even though the UE may have been released to IDLE, suspended to INACTIVE, or abandoned the RRC resume procedure to receiving a message which could not be decrypted. This would in turn mean that UE would trigger the actions upon the expiration of this timer when it is not needed, i.e. the actions on the expiration of the timer should only be executed when the UE is still in a state where it is waiting for network response.

SUMMARY

To address the foregoing problems with existing solutions, disclosed is methods, and a user equipment (UE) for avoiding unnecessary actions in a connection establishment by using a timer to stop the connection establishment at certain events. The present disclosure enables the UE to be stopped upon an expiry of the resume procedure, and further prevents the UE from keeping awaiting a response from the network or performing unnecessary actions after the expiry of the resume procedure.

Several embodiments are elaborated in this disclosure. According to an embodiment of a method, the method for a connection establishment in a user equipment (UE) comprises sending a request to a network node to initiate the connection establishment. The method additionally comprises upon sending the request to the network node, starting a timer for the connection establishment, wherein an expiration of the timer stops the connection establishment for the UE. The method further additionally comprises stopping the timer to stop the connection establishment upon the UE receiving a suspend message or a release message, or upon the UE performing a cell reselection procedure while the timer is running.

In one embodiment, the connection establishment may be a resume procedure, a setup procedure, or an early data transmission.

In one embodiment, the method further comprises delaying following actions which the UE should execute after receiving the release message for a period of time after stopping the timer to stop the connection establishment upon the UE receiving the release message. In another embodiment, the method further comprises storing cell information at the UE when the release message includes mobility control information. In yet another embodiment, the method further comprises applying cell information in system information when the release message does not include mobility control information.

In one embodiment, the method further comprises delaying following actions which the UE should execute after receiving the suspend message for a period of time, indicating a suspension of connection establishment to upper layers, and configuring lower layers to suspend an integrity protection in response to stopping the timer to stop the connection establishment upon the UE receiving the suspend message. In one embodiment, the period of time is 60 ms.

In one embodiment, the method further comprises resetting MAC, releasing a MAC configuration, and informing upper layers a failure of the connection establishment after stopping the timer to stop the connection establishment upon the UE performing the cell reselection while the timer is running.

According to an embodiment of a UE, the UE for a connection establishment comprises at least one processing circuitry and at least one storage that stores processor-executable instructions, when executed by the processing circuitry, causes the user equipment to send a request to a network node to initiate the connection establishment, upon sending the request to the network node, start a timer for the connection establishment, wherein an expiration of the timer stops the connection establishment, and stop the timer to stop the connection establishment upon receiving a suspend message or a release message. In one embodiment, the UE may stop the timer to stop the connection establishment upon performing a cell reselection procedure while the timer is running.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide a secure mechanism to stop UE upon an expiry of the connection establishment by using a timer to stop UE. The method may set the timer to stop UE when UE is performing certain actions while the timer is running. The method may also set the timer to stop UE when UE receives a return message from the network node. In this way, the method may prevent UE from generating more signaling in the network when it is not needed.

Particular embodiments offer a comprehensive timer which may be used in the connection establishment in both LTE and NR. The timer in particular embodiments may stop the UE upon certain events to avoid unnecessary actions which should not be executed in the expired connection establishment. Particular embodiments further preserve UE battery and improve the efficiency of resources in the network by stopping UE in the connection establishment at an appropriate timing. Particular embodiments include methods which prevent error messages from happening when UE is stuck in an infinite loop waiting for a response from the network.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
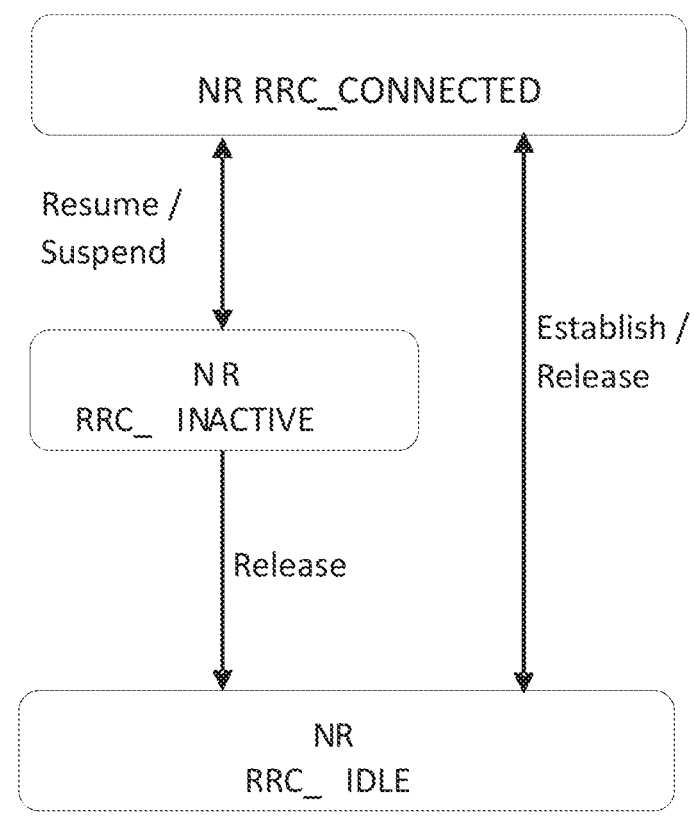
FIG. 1 illustrates example state transitions of a user equipment in New Radio (NR)
Figure 2:
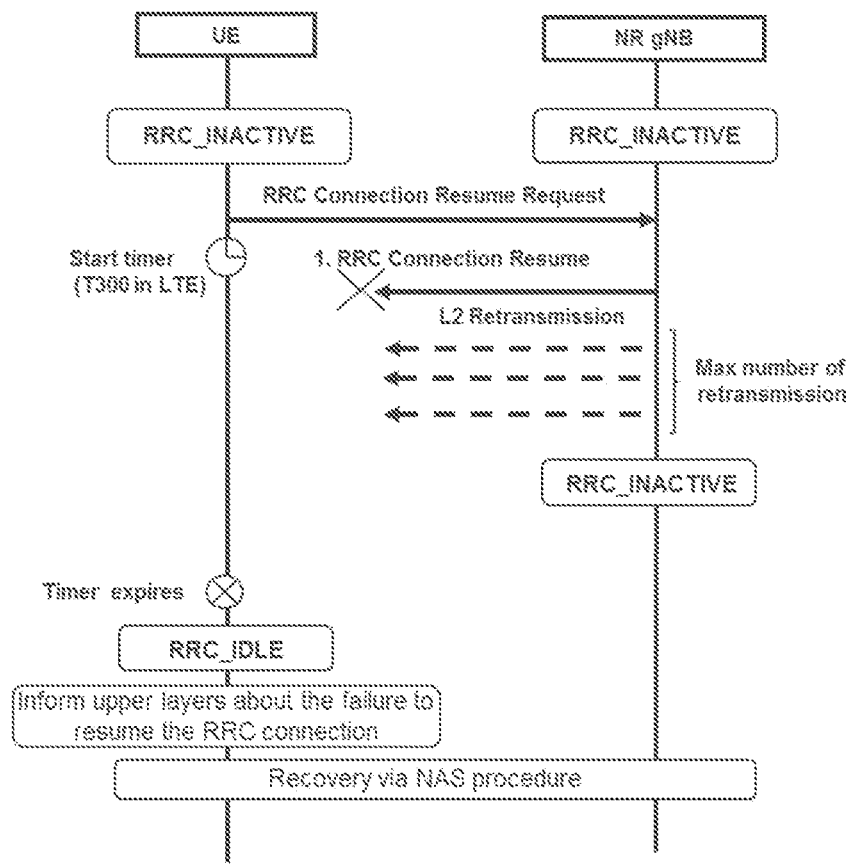
FIG. 2 illustrates an example resume procedure failure caused by bad downlink radio condition.
Figure 3:
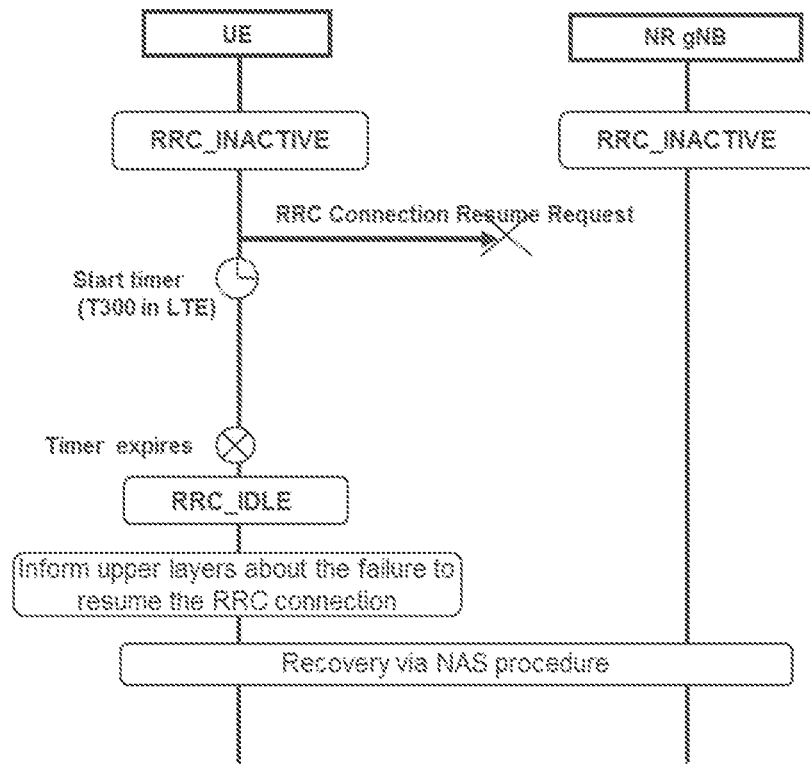
FIG. 3 illustrates an example resume procedure failure caused by bad uplink radio condition.
Figure 4:
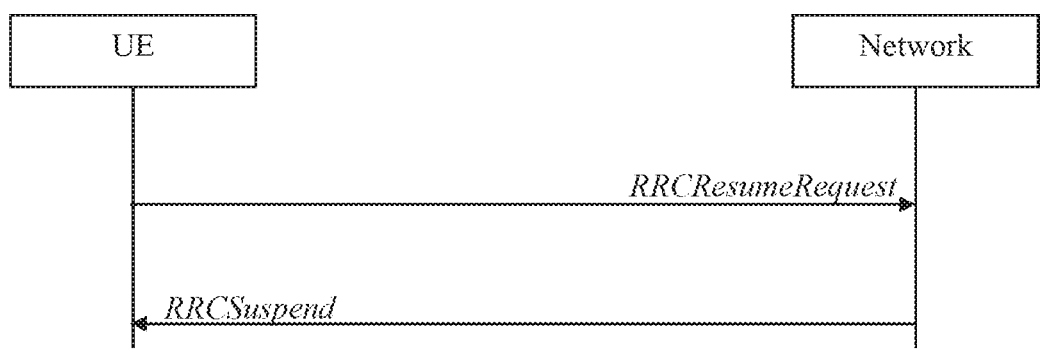
FIG. 4 illustrates an example RRC Connection Resume procedure when network responds with a release message.
Figure 5:
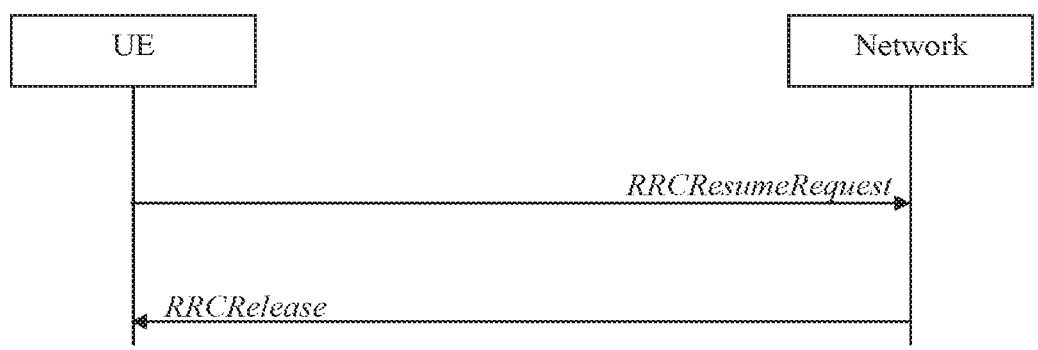
FIG. 5 illustrates an example RRC Connection Resume procedure when network responds with a suspend message.

A conventional timer may not be applicable under certain bad downlink/uplink transmissions in LTE or most events in NR. In such cases, the conventional timer will continue to run even though the UE may have been changed to another state. Therefore, particular embodiments of the present disclosure propose a method to provide a failure timer to stop the resume procedure upon the UE receiving a message from the network, the UE performing certain actions while the timer is running, or the timer is expiring. The failure timer of the present disclosure is introduced to prevent the UE from executing unnecessary procedure when the failure timer times out.

By utilizing the failure timer in the resume procedure, the UE may be stopped when the UE receives a valid message from the network, such as a setup message, a reject message, a release message, and a suspend message, such that the UE may stop awaiting the resume procedure and change to a corresponding state based on the received message without generating more signaling. In particular embodiments, the failure timer may also stop the UE when the UE is performing certain actions while the failure timer is running, such as a detection of the integrity check failure from the lower layers, a cell reselection, or an abortion of connection establishment. This solution also enables the failure timer to stop the resume procedure under a limited period of time, which prevents the UE from awaiting a response from the network when the network is being compromised by bad downlink/uplink transmissions.

There are, proposed herein, various embodiments which address one or more of the issues disclosed herein. Certain embodiments may provide one or more of the following technical advantages. For example, by using the timer triggered by the above scenarios, it is beneficial to avoid a UE performing an unnecessary procedure when the timer times out, which would generate more signaling in the network, consume more UE battery, and create unnecessary interference. Certain embodiments may provide some, none, or all of these advantages, and other technical advantages will be readily apparent to those of skill in the art.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "signaling" used herein may comprise any of: high-layer signaling (e.g., via radio resource control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Particular embodiments are based on introducing new mechanisms for stopping the failure timer, T. In addition to the existing cases when the timer, T, is stopped in LTE, the timer is also stopped in the following events when the UE is performing the resume procedure, i.e. when the UE has sent a ResumeRequest message. For example, the timer, T, stops when the UE receives the Suspend message, when the UE receives the Release message, and when the UE has detected an integrity protection verification error in lower layers (e.g. PDCP layer) while timer, T, is running.

Additionally, if a separate failure timer, T, is introduced from the timer T300 used for RRC connection re-establishment, the timer T also may be stopped in the following events when the UE is performing the resume procedure. For example, the timer, T, stops when the UE receives a RRCConnectionSetup message, when the UE receives a RRCReject message, and when the UE performs a cell reselection while the timer, T, is running. The events listed above are not exhaustive, and it will be appreciated that other situations may occur where the timer, T, may be stopped.

Particular embodiments of the present disclosure are implemented in 38.331 NR RRC specification. According to a first embodiment of the method, the resume procedure is triggered when RRCResumeRequest or RRCRequest is transmitted and a single timer, T300, is defined in the resume procedure. When the UE receives the RRCSuspend message, e.g. upon reception of the RRCSuspend by the UE as specified in 5.3.14.3, the UE may:

1> delay the following actions defined in this sub-clause X ms from the moment the RRCSuspend message was received or optionally when lower layers indicate that the receipt of the RRCSuspend message has been successfully acknowledged, whichever is earlier.

1> if the RRCSuspend message includes the idleModeMobilityControlInfo:

2> store the cell reselection priority information provided by the idleModeMobilityControlInfo;

2> if the t320 is included:

3> start timer T320, with the timer value set according to the value of t320;

1> else:

2> apply the cell reselection priority information broadcast in the system information;

1> store the following information provided by the network: resumeIdentity, nextHopChainingCount, ranPagingCycle and ran-NotificationAreaInfo;

1> re-establish RLC entities for all SRBs and DRBs;

1> except if the RRCSuspend message was received in response to an RRCResumeRequest:

2> store the UE AS Context including the current RRC configuration, the current security context, the PDCP state including ROHC state, C-RNTI used in the source PCell, the cellIdentity and the physical cell identity of the source PCell;

1> suspend all SRB(s) and DRB(s), except SRB0;

1> start timer T380, with the timer value set to periodic-RNAU-timer;

1> indicate the suspension of the RRC connection to upper layers;

1> configure lower layers to suspend integrity protection and ciphering;

1> enter RRC_INACTIVE and perform procedures as specified in TS 38.304 [21].

In certain embodiments, the value of X may be configurable. In certain embodiments, the value of X may be 60 ms in LTE. In certain embodiments, the above configuration of UE may be applied to a setup procedure, or an early data transmission for establishing a connection.

When the UE receives the RRCRelease message, e.g. upon reception of the RRCRelease by the UE as specified in 5.3.8.3, the UE may:

1> discard any stored UE AS context and I-RNTI;

1> stop the timer T300 if running;

1> delay the following actions defined in this sub-clause X ms from the moment the RRCRelease message was received or optionally when lower layers indicate that the receipt of the RRCRelease message has been successfully acknowledged, whichever is earlier;

1> if the RRCRelease message includes the idleModeMobilityControlInfo:

2> store the cell reselection priority information provided by the idleModeMobilityControlInfo;

2> if the t320 is included:

3> start timer T320, with the timer value set according to the value of t320;

1> else:

2> apply the cell reselection priority information broadcast in the system information;

1> perform the actions upon going to RRC_IDLE as specified in 5.3.11.

In certain embodiment, the value of X may be configurable. In certain embodiments, the value of X may be 60 ms in LTE. In certain embodiments, the RRCRelease procedure may support a mechanism which is equivalent to loadBalancingTAURequired. In certain embodiments, the RRCRelease procedure may be triggered by different release causes and may be associated with different actions.

When the resume procedure is triggered upon a T300 expiry or an integrity check failure from lower layers while T300 is running, e.g. upon T300 expiry or Integrity check failure from lower layers while T300 is running as specified in 5.3.13.5, the UE may:

1> if timer T300 expires or Integrity check failure from lower layers while T300 is running:

2> stop timer T300, if running;

2> discard the stored UE AS context and resumeIdentity;

2> reset MAC, release the MAC configuration and re-establish RLC for all RBs that are established;

2> inform upper layers about the failure to resume the RRC connection, upon which the procedure ends.

In certain embodiments, T319 may be the same as T300. In certain embodiments, the above configuration of UE may be applied to a setup procedure, or an early data transmission for establishing a connection.

Table 1 below illustrates the timers, T300 and T302, of the present disclosure implemented in the resume procedure as specified in 7.1.1, according to certain embodiments.

TABLE 1

| Timer | Start | Stop | At expiry |
|---|---|---|---|
| T300 | Transmission of RRCRequest, or transmission of RRCResumeRequest. | Reception of RRCSetup or RRCReject, RRCRelease, or RRCSuspend message, cell reselection and upon abortion of connection establishment by upper layers. | Perform the actions as specified in 5.3.3.6. |
| T302 | Reception of RRCReject while performing RRC connection establishment or resume. | Upon entering RRC_CONNECTED and upon cell reselection. | Inform upper layers about barring alleviation as specified in 5.3 sections. |

According to a second embodiment of the method, T300 is triggered when RRCRequest is transmitted and T319 is triggered when RRCResumeRequest is transmitted in the resume procedure, e.g. in 5.2.2. In the second embodiment, an additional step may be to select whether T300 or T319 to start. Also, even if in LTE, the UE may be able to receive an RRCReject or RRCSetup in response to RRCConnectionResumeRequest or RRCConnectionRequest, the two timers, T300 and T319, are defined requires potential changes in each embodiment in the present disclosure, in addition to the procedures which are completely new for NR. Therefore, particular embodiments illustrated in the present disclosure includes certain parts equivalent to 5.2.1, which are completely new due to the new NR procedures. In certain embodiments, T300 or T319 may be applied to an early data transmission for establishing a connection.

When the UE receives the RRCSuspend message, e.g. upon reception of the RRCSuspend by the UE as specified in 5.3.14.3, the UE may:
1> delay the following actions defined in this sub-clause X ms from the moment the RRCSuspend message was received or optionally when lower layers indicate that the receipt of the RRCSuspend message has been successfully acknowledged, whichever is earlier;
1> stop the timer T300 or T319 if running;
1> if the RRCSuspend message includes the idleModeMobilityControlInfo:
   2> store the cell reselection priority information provided by the idleModeMobilityControlInfo;
   2> if the t320 is included:
      3> start timer T320, with the timer value set according to the value of t320;
1> else:
   2> apply the cell reselection priority information broadcast in the system information;
1> store the following information provided by the network: resumeIdentity, nextHopChainingCount, ran-PagingCycle and ran-NotificationAreaInfo;
1> re-establish RLC entities for all SRBs and DRBs;
1> except if the RRCSuspend message was received in response to an RRCResumeRequest:
   2> store the UE AS Context including the current RRC configuration, the current security context, the PDCP state including ROHC state, C-RNTI used in the source PCell, the cellIdentity and the physical cell identity of the source PCell;
1> suspend all SRB(s) and DRB(s), except SRB0;
1> start timer T380, with the timer value set to periodic-RNAU-timer;
1> indicate the suspension of the RRC connection to upper layers;
1> configure lower layers to suspend integrity protection and ciphering;
1> enter RRC_INACTIVE and perform procedures as specified in TS 38.304 [21]

In certain embodiment, the value of X may be configurable. In certain embodiments, the value of X may be 60 ms in LTE.

When the UE receives the RRCRelease message, e.g. upon reception of the RRCRelease by the UE as specified in 5.3.8.3, the UE may:
1> discard any stored UE AS context and I-RNTI;
1> stop the timer T300 or T319 if running;
1> delay the following actions defined in this sub-clause X ms from the moment the RRCRelease message was received or optionally when lower layers indicate that the receipt of the RRCRelease message has been successfully acknowledged, whichever is earlier;
1> if the RRCRelease message includes the idleModeMobilityControlInfo:
   2> store the cell reselection priority information provided by the idleModeMobilityControlInfo;
   2> if the t320 is included:
      3> start timer T320, with the timer value set according to the value of t320;
1> else:
   2> apply the cell reselection priority information broadcast in the system information;
1> perform the actions upon going to RRC_IDLE as specified in 5.3.11.

In certain embodiment, the value of X may be configurable. In certain embodiments, the value of X may be 60 ms in LTE. In certain embodiments, the RRCRelease procedure may support a mechanism which is equivalent to loadBalancingTAURequired. In certain embodiments, the RRCRelease procedure may be triggered by different release causes and may be associated with different actions.

According to a third embodiment of the method, particular embodiments illustrate the implementation of the parts in NR that are equivalent to existing LTE responses but take into account that two different timers T300 and T319 may be defined. When the UE receives the RRCSetup message, e.g. upon reception of the RRCSetup by the UE as specified in 5.3.3.4, the UE may:
1> if the RRCSetup is received in response to an RRCResumeRequest:
   2> discard the stored UE AS context and I-RNTI;
   2> indicate to upper layers that the RRC connection resume has been fallbacked;

1> perform the cell group configuration procedure in accordance with the received masterCellGroup and as specified in 5.3.5.5;
1> perform the radio bearer configuration procedure in accordance with the received radioBearerConfig and as specified in 5.3.5.6;
1> if stored, discard the cell reselection priority information provided by the idleModeMobilityControlInfo or inherited from another RAT;
1> stop timer T300 or T319 if running;
1> stop timer T320, if running;
1> enter RRC_CONNECTED;
1> stop the cell re-selection procedure;
1> consider the current cell to be the PCell;
1> set the content of RRCSetupComplete message as follows:
  2> if the RRCConnectionSetup is received in response to an RRCResumeRequest:
    3> if upper layers provide an 5G-S-TMSI:
      4> set the ng-5G-S-TMSI to the value received from upper layers;
  2> set the selectedPLMN-Identity to the PLMN selected by upper layers (TS 24.501 [23]) from the PLMN(s) included in the plmn-IdentityList in SystemInformationBlockType;
  2> if upper layers provide the 'Registered AMF':
    3> include and set the registeredAMF as follows:
      4> if the PLMN identity of the 'Registered AMF' is different from the PLMN selected by the upper layers:
        5> include the plmnIdentity in the registeredAMF and set it to the value of the PLMN identity in the 'Registered AMF' received from upper layers;
      4> set the amf-Region, amf-SetId, amf-Pointer to the value received from upper layers;
    3> include and set the guami-Type to the value provided by the upper layers;
  2> if upper layers provide one or more S-NSSAI (see TS 23.003 [20]):
    3> include the s-nssai-list and set the content to the values provided by the upper layers;
  2> set the dedicatedInfoNAS to include the information received from upper layers;
  2> submit the RRCSetupComplete message to lower layers for transmission, upon which the procedure ends;

In certain embodiments, idleModeMobilityControlInfo may also be applied for UEs entering RRC_INACTIVE. In this case, the name of the information element (IE) may be changed. In certain embodiments, the UE actions related to access control timers may be defined. The access control timers may be equivalent to T302, T303, T305, T306, T308 in LTE. For example, informing upper layers if a given timer is not running. In certain embodiments, the guami-Type may further be determined to be included and set in the above-mentioned condition.

Upon an T300 or T319 expiry, e.g. as specified in 5.3.3.6, the UE may:
1> if timer T300 or T300X expires:
  2> reset MAC, release the MAC configuration and re-establish RLC for all RBs that are established;
  2> inform upper layers about the failure to establish the RRC connection, upon which the procedure ends.

When the UE receives the RRCReject message, e.g. upon reception the RRCReject by the UE as specified in 5.3.15, the UE may:
1> stop timer T300 or T300X;
1> reset MAC and release the MAC configuration;
1> start timer T302, with the timer value set to the waitTime;
1> inform upper layers about the failure to establish the RRC connection and access control related information, upon which the procedure ends.

In certain embodiments, RRCReject may include redirection information and/or frequency/RAT reprioritization information. In certain embodiments, certain access control related information may be informed to higher layers.

When T319 is expiring or the UE receives an integrity check failure from lower layers while T319 is running, e.g. as specified in 5.3.13.5, the UE may:
1> if timer T300X expires or Integrity check failure from lower layers while T300X is running:
  2> stop timer T300X, if running;
  2> discard the stored UE AS context and resumeIdentity;
  2> reset MAC, release the MAC configuration and re-establish RLC for all RBs that are established;
  2> inform upper layers about the failure to resume the RRC connection, upon which the procedure ends.

In certain embodiments, T319 may be the same as T300.

When the UE performs a cell reselection while T300 is running, e.g. in the resume procedure as specified in 5.3.3.5, the UE may:
1> if cell reselection occurs while T300 is running:
  2> if timer T300 is running:
    3> stop timer T300;
    3> reset MAC, release the MAC configuration and re-establish RLC for all RBs that are established;
    3> inform upper layers about the failure to establish the RRC connection or failure to resume the RRC connection.

In certain embodiments, the cell reselection actions may need to be defined for other timers, such as access control timers equivalent to T302, T303, T305, T306 and T308 in LTE. In certain embodiments, the above configuration of UE may be applied to a setup procedure, or an early data transmission for establishing a connection.

When the UE performs a cell reselection while T300 or T319 is running, e.g. in the resume procedure as specified in 5.3.3.5, the UE may:
1> if cell reselection occurs while T300 or T300X is running:
  2> if timer T300 is running:
    3> stop timer T300;
    3> reset MAC, release the MAC configuration and re-establish RLC for all RBs that are established;
    3> inform upper layers about the failure to establish the RRC connection or failure to resume the RRC connection;
  2> else if timer T300X is running:
    3> stop timer T300X;
    3> reset MAC, release the MAC configuration and re-establish RLC for all RBs that are established;
    3> inform upper layers about the failure to establish the RRC connection or failure to resume the RRC connection.

In certain embodiments, the cell reselection actions may need to be defined for other timers, such as access control timers equivalent to T302, T303, T305, T306 and T308 in LTE. In certain embodiments, the above configuration of UE may be applied to a setup procedure, or an early data transmission for establishing a connection.

Table 2 below illustrates the timers, T300, T319 and T302, of the present disclosure implemented in the resume procedure as specified in 7.1.1, according to certain embodiments.

TABLE 2

| Timer | Start | Stop | At expiry |
|---|---|---|---|
| T300 | Transmission of RRCRequest or transmission of RRCResumeRequest. | Reception of RRCSetup, RRCReject, RRCRelease, or RRCSuspend message, cell reselection and upon abortion of connection establishment by upper layers. | Reset MAC, release the MAC configuration and re-establish RLC for all RBs that are established, and inform upper layers about the failure to establish the RRC connection, upon which the procedure ends, or perform the actions as specified in 5.3.3.6. |
| T319 | Transmission of RRCResumeRequest. | Reception of RRCSetup or RRCReject, or RRCRelease, or RRCSuspend message, upon cell reselection and upon abortion of connection establishment by upper layers. | Discard the stored UE AS context and resumeIdentity, reset MAC, release the MAC configuration and re-establish RLC for all RBs that are established; and inform upper layers about the failure to resume the RRC connection, upon which the procedure ends, or perform actions as specified in 5.3.13.5. |
| T302 | Reception of RRCReject while performing RRC connection establishment or resume. | Upon entering RRC_CONNECTED and upon cell reselection. | Inform upper layers about barring alleviation as specified in 5.3 sections. |

Figure 6:
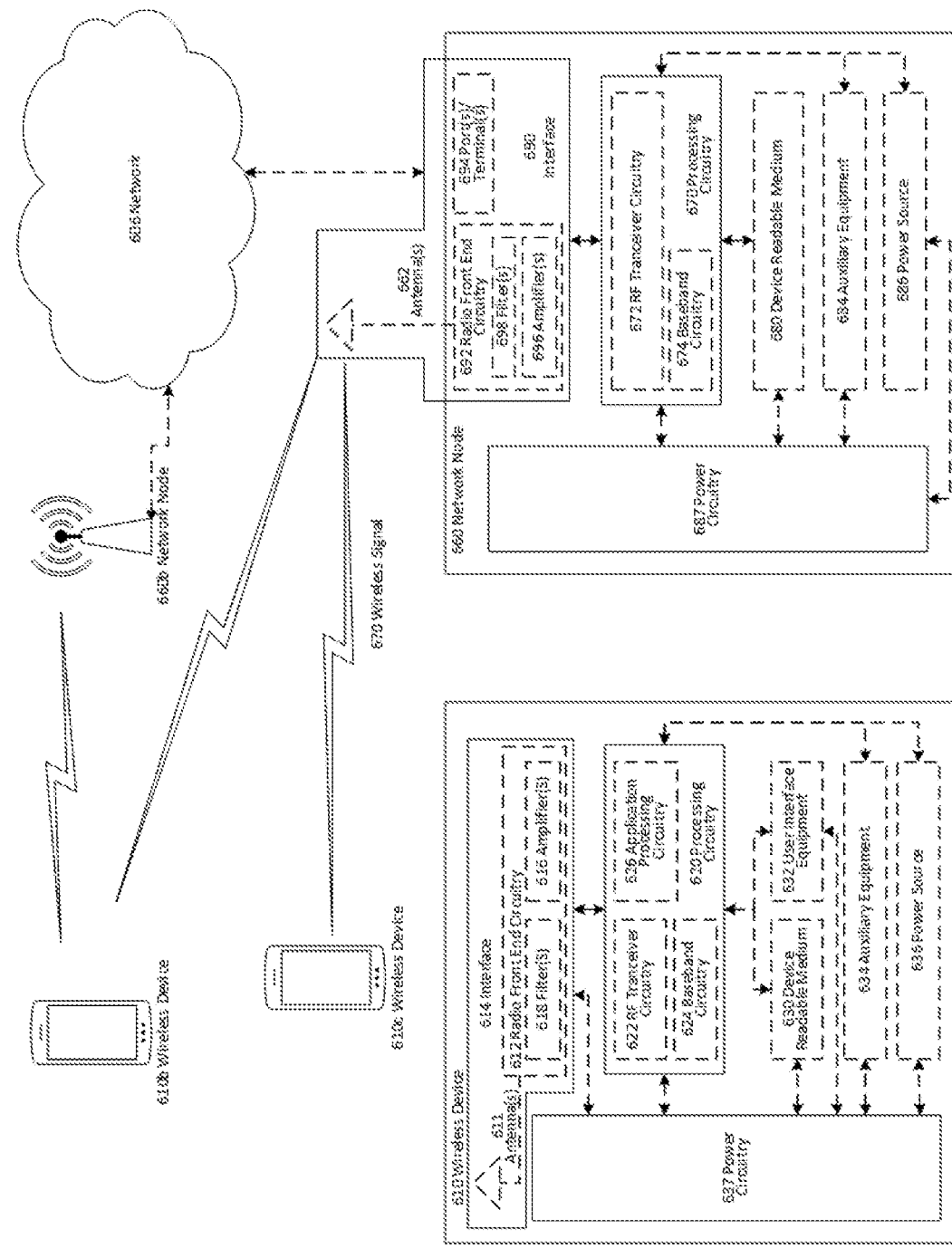
FIG. 6 illustrates an example wireless network, according to certain embodiments.

FIG. 6 is an example wireless network, according to certain embodiments in accordance with certain embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. In some embodiments, the network node 660 may be a base station which is further depicted in FIG. 9. In certain embodiments, the wireless device 610 may be a user equipment, which is further illustrated in FIGS. 7, 9-14, and 16. Wireless device 610 may perform the methods described with respect to FIG. 15. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 810 may be a user equipment which is further depicted in FIGS. 7 and 9-16. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
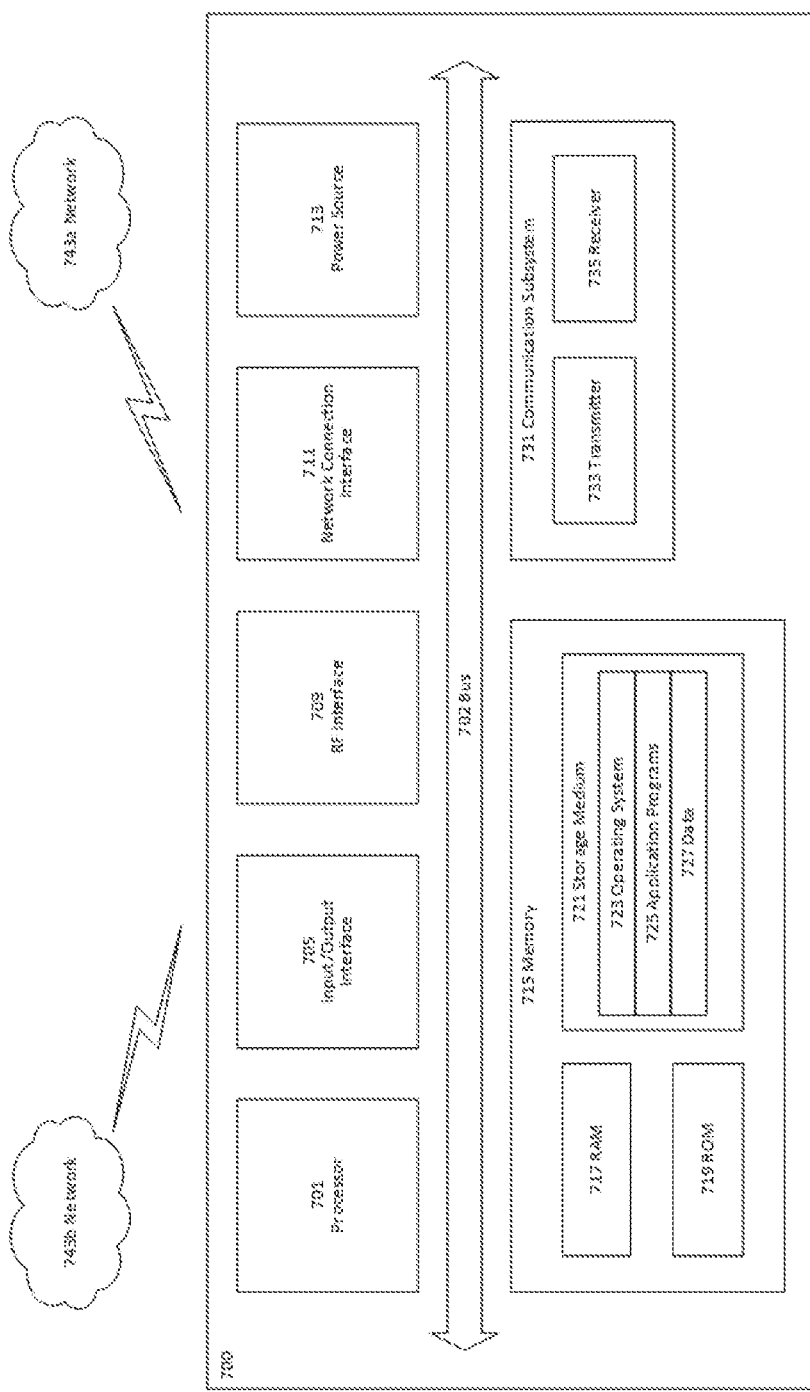
FIG. 7 illustrates an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may also comprise any UE identified by the 3rd Generation Partnership Project (3GPP), including a NB-IoT UE that is not intended for sale to, or operation by, a human user. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 700 may be a user equipment which is further depicted in FIG. 16. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
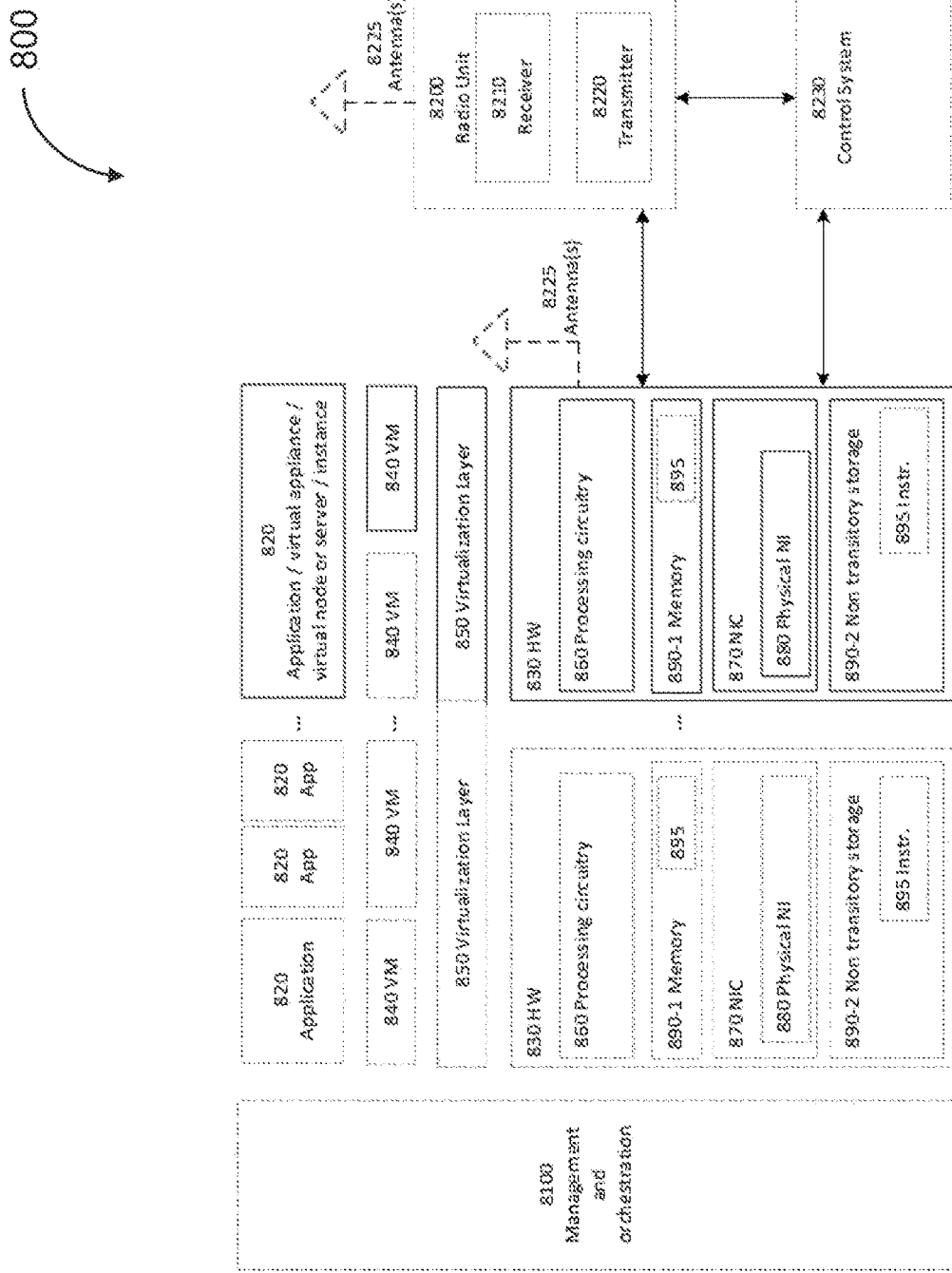
FIG. 8 illustrates an example virtualization environment, according to certain embodiments.

FIG. 8 illustrates an example virtualization environment, according to certain embodiments. FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be affected with the use of control system 8230 which may alternatively be used for communication between the hardware nodes 830 and radio units 8200.

Figure 9:
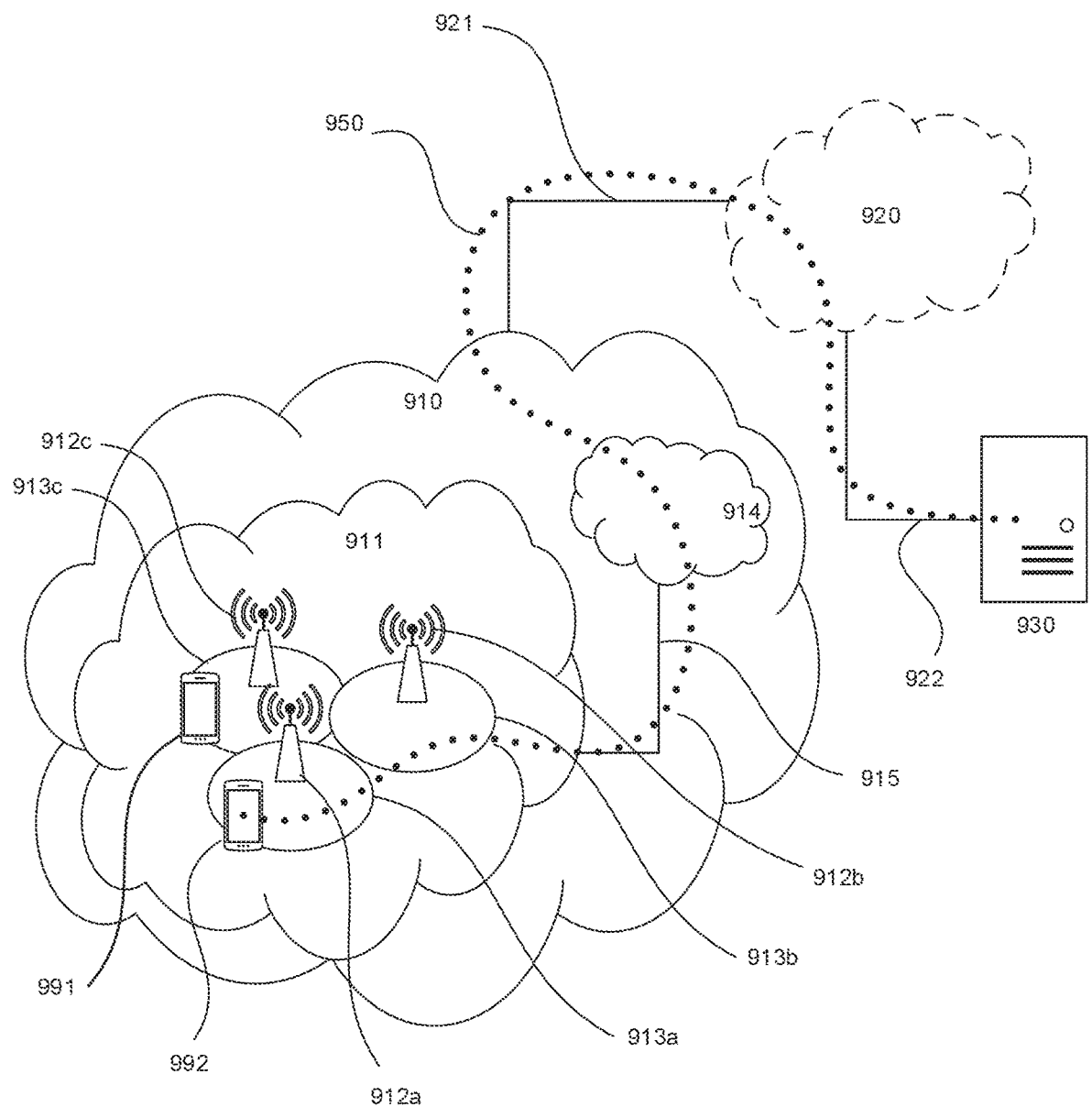
FIG. 9 illustrates an example telecommunication network connected via an intermediate network to a host computer, according to certain embodiments.

FIG. 9 illustrates an example telecommunication network connected via an intermediate network to a host computer, according to certain embodiments. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. In certain embodiments, the base stations 912a, 912b, 912c may be a network node as described herein. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912. In certain embodiments, the plurality of UEs 991, 992 may be the user equipment as described with respect to FIG. 16.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 10:
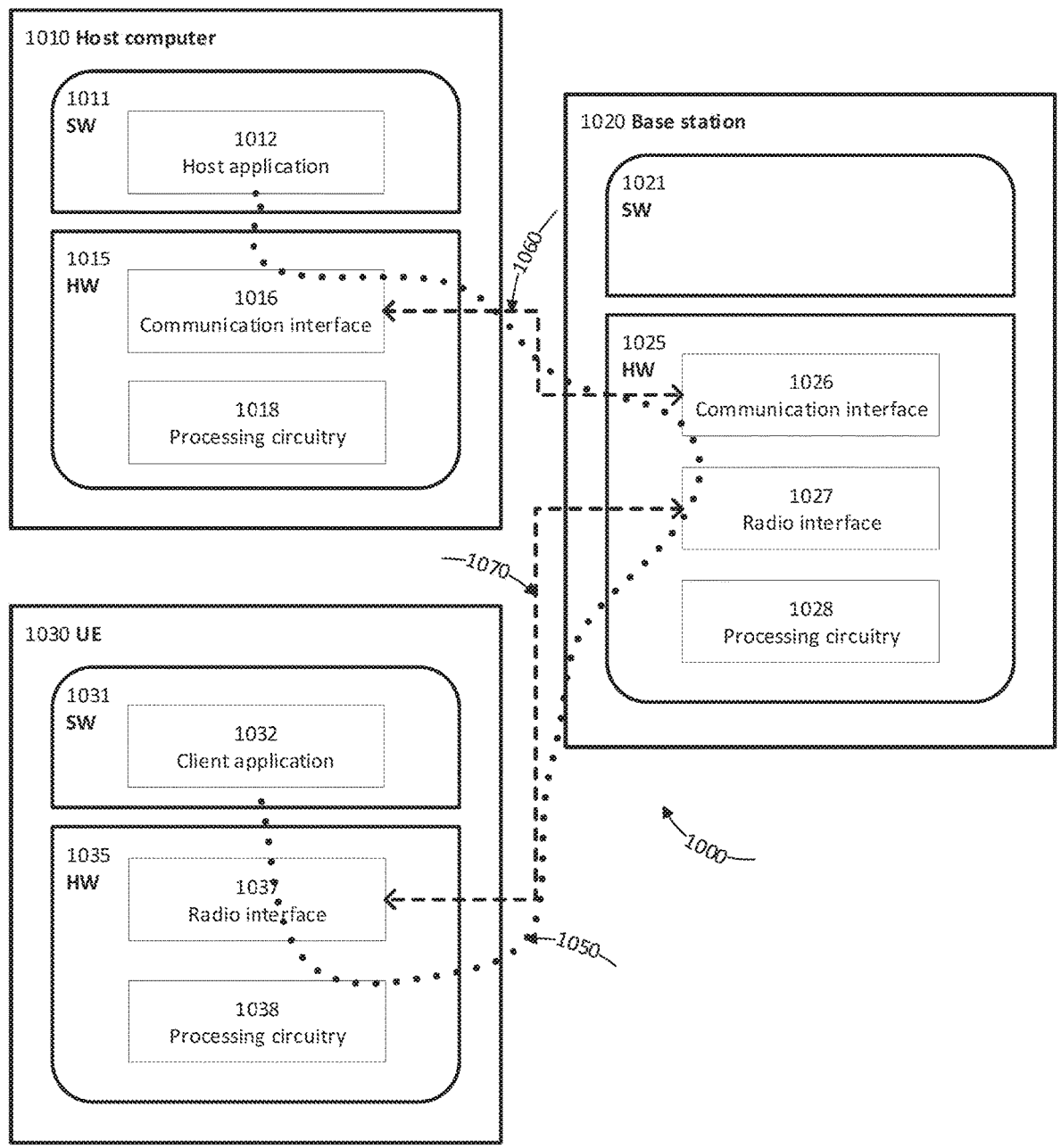
FIG. 10 illustrates an example host computer communicating via a base station with a user equipment over a partially wireless connection, according to certain embodiments.

FIG. 10 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. In certain embodiments, the base station 1020 may be a network node as described herein. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. In certain embodiments, the UE 1030 may be the user equipment as described with respect to FIGS. 11-13 and 16. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the data rate, latency, and power consumption and thereby provide benefits such as reduced user waiting time, better responsiveness, less interference, and extended battery lifetime.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
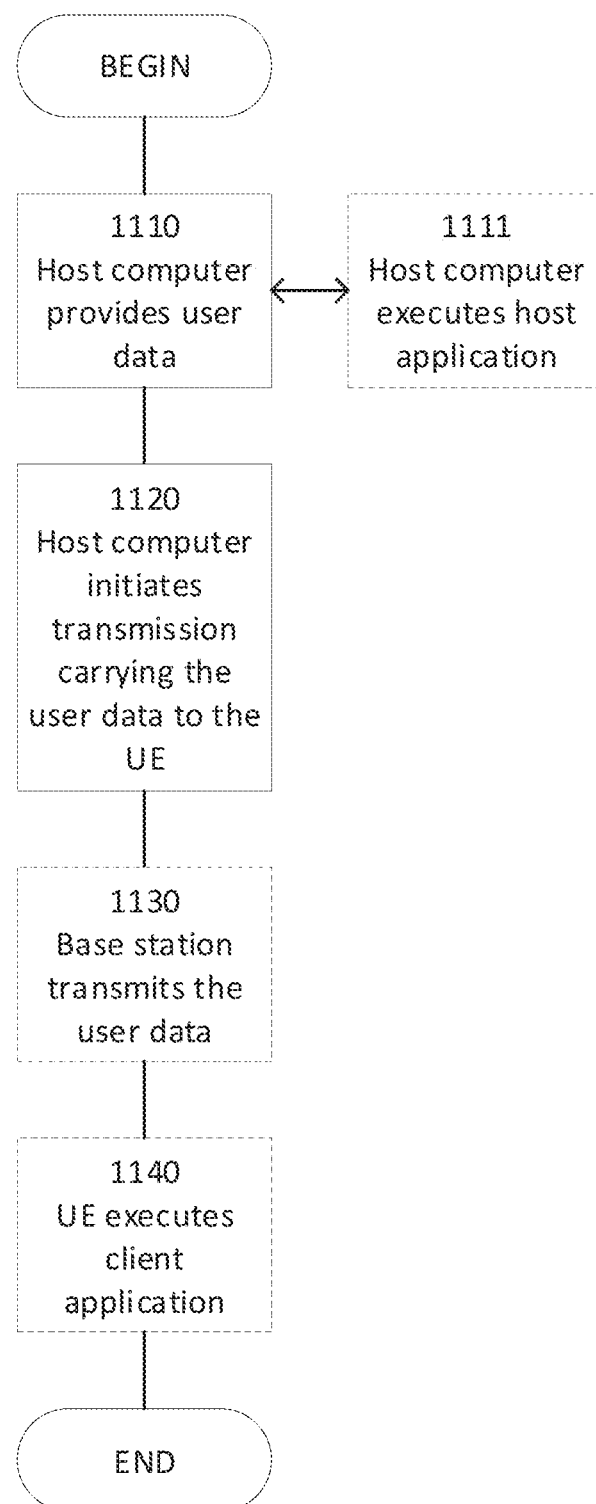
FIG. 11 illustrates an example method implemented in a communication system including a host computer, a base station and a user equipment, according to certain embodiments.

FIG. 11 illustrates an example method implemented in a communication system including a host computer, a base station and a user equipment, according to certain embodiments in accordance with some embodiments. More specifically, FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
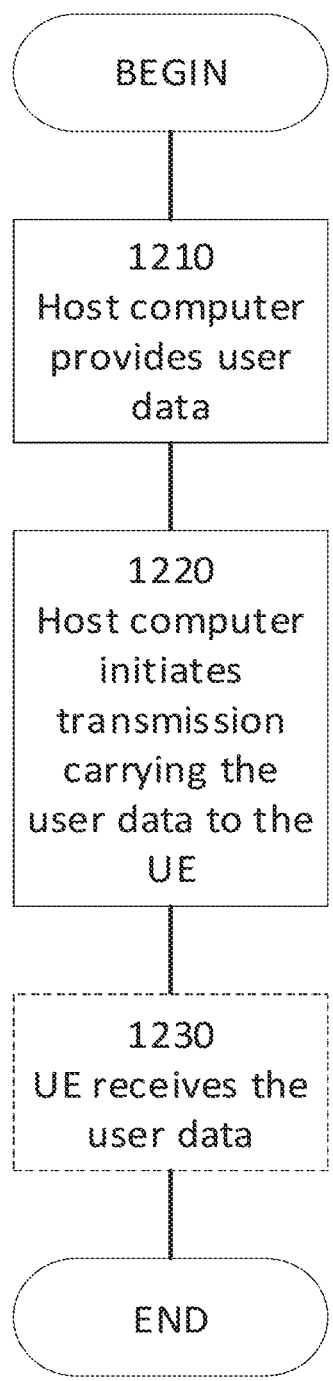
FIG. 12 illustrates another example method implemented in a communication system including a host computer, a base station and a user equipment, according to certain embodiments.

FIG. 12 illustrates an example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
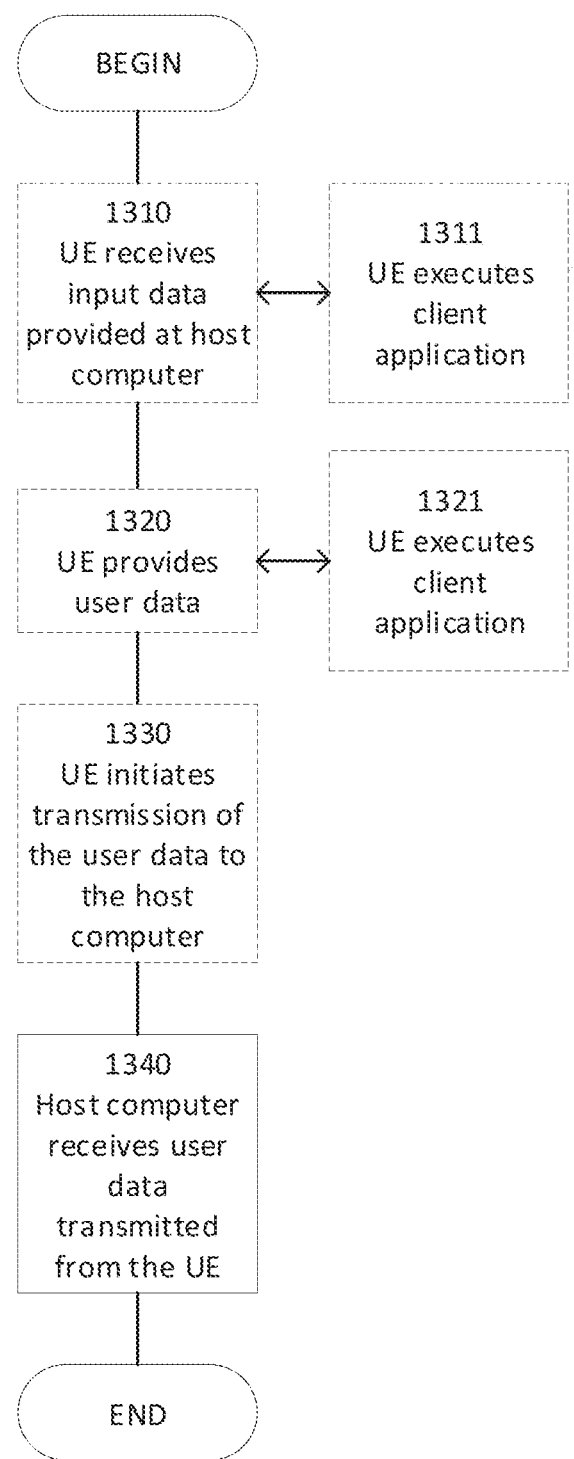
FIG. 13 illustrates another further example method implemented in a communication system including a host computer, a base station and a user equipment, according to certain embodiments.

FIG. 13 illustrates another further example method implemented in a communication system including a host computer, a base station and a user equipment, in accordance with some embodiments. More specifically, FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
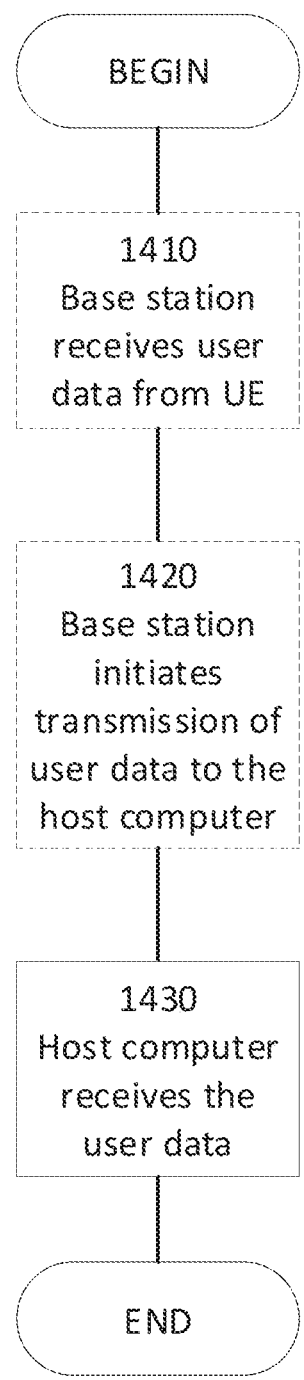
FIG. 14 illustrates another yet example method implemented in a communication system including a host computer, a base station and a user equipment, according to certain embodiments.

FIG. 14 illustrates another example method implemented in a communication system including a host computer, a base station and a user equipment, in accordance with some embodiments. More specifically, FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
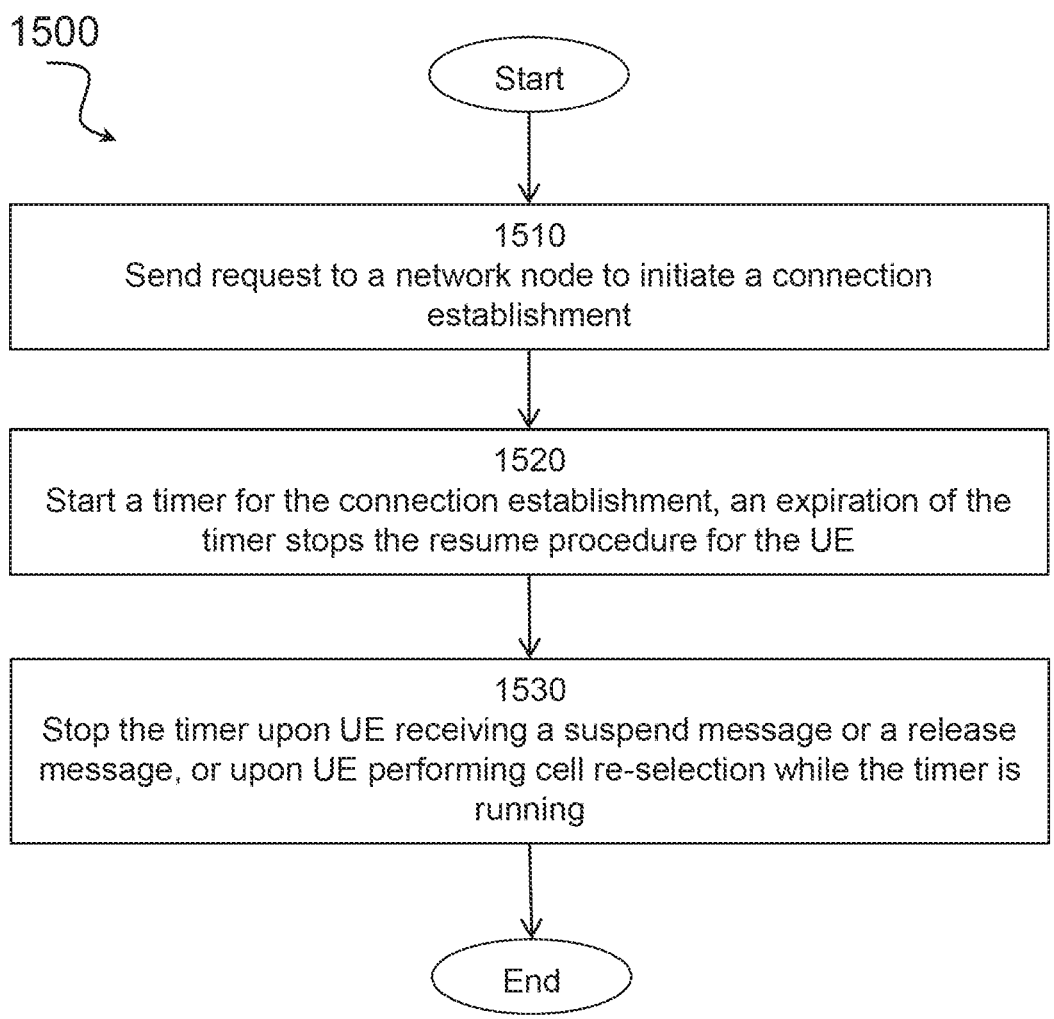
FIG. 15 illustrates a flow diagram of a method in a user equipment, in accordance with certain embodiments.

FIG. 15 is a flow diagram of a method performed at a user equipment, in accordance with certain embodiments. Method 1500 begins at step 1510 with the UE sending a request to a network node to initiate a connection establishment. In certain embodiments, the connection establishment may be a resume procedure, a setup procedure, or an early data transmission.

At step 1520, the UE starts a timer for the connection establishment. In some embodiments, the UE may start the timer upon sending the request to the network node. In some embodiments, an expiration of the timer may stop the connection establishment.

At step 1530, the UE stops the timer to stop the connection establishment upon receiving a suspend message or a release message, or upon performing a cell reselection procedure while the timer is running. In certain embodiments, the timer may be set to stop the connection establishment upon certain events.

In certain embodiments, the method may further comprise, in response to stopping the timer upon the UE receiving the release message, delaying, for a period of time, actions which the UE is to execute after receiving the release message. When the UE receives the release message including mobility control information, the UE may further store cell information. On the other hand, when the UE receives the release message without the mobility control information, the UE may further apply the cell information in the system information. In certain embodiments, the method may further comprise indicating a suspension of connection establishment to upper layers, and configuring lower layers to suspend an integrity protection after stopping the timer upon the UE receiving the suspend message. In some embodiments, the actions may be delayed for 60 ms.

In certain embodiments, the method may further comprise, in response to stopping the timer upon the UE performing the cell reselection procedure while the timer is running, resetting MAC, releasing a MAC configuration, and informing upper layers of a failure of the connection establishment.

Figure 16:
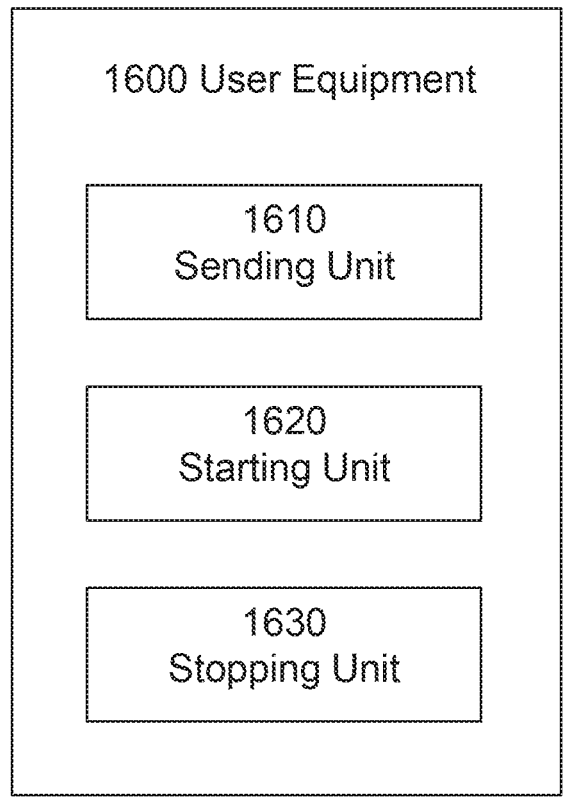
FIG. 16 illustrates a block schematic of an exemplary user equipment, in accordance with certain embodiments.

FIG. 16 is a schematic block diagram of an exemplary user equipment, in accordance with certain embodiments. The user equipment 1600 may be used in a wireless network (for example, the wireless network shown in FIG. 6). The user equipment 1600 may be implemented in a wireless device or network node (e.g., wireless device 610 or network node 660 shown in FIG. 6). User equipment 1600 is operable to carry out the example method described with reference to FIG. 15 and possibly any other processes or methods disclosed herein. It is also to be understood that the method of FIG. 15 is not necessarily carried out solely by user equipment 1600. At least some operations of the method can be performed by one or more other entities.

User equipment 1600 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1600 may be the processing circuitry 620 shown in FIG. 6. In some embodiments, the processing circuitry of user equipment 1600 may be the processor 701 shown in FIG. 7. The processing circuitry may be configured to execute program code stored in memory 715 shown in FIG. 7, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 1610, starting unit 1620 and stopping unit 1630, and any other suitable units of user equipment 1600 to perform corresponding functions according one or more embodiments of the present disclosure, such as a transmitter and a receiver.

As illustrated in FIG. 16, user equipment 1600 includes sending unit 1610, starting unit 1620 and stopping unit 1630. The sending unit 1610 may be configured to send a request to a network node to initiate a connection establishment. In certain embodiments, the connection establishment may be a resume procedure, a setup procedure, or an early data transmission.

The starting unit 1620 may be configured to start a timer for the connection establishment. In some embodiments, the starting unit 1620 may start the timer upon the sending unit

1610 sending the request to the network node. In some embodiments, an expiration of the timer may stop the connection establishment.

The stopping unit 1630 may be configured to stop the connection establishment upon receiving a suspend message or a release message, or upon performing a cell reselection procedure while the timer is running. In certain embodiments, the timer may be set to stop the connection establishment upon certain events.

In certain embodiments, the UE 1600 may further, in response to stopping the timer upon receiving the release message, delay, for a period of time, actions which the UE 1600 is to execute after receiving the release message. When the UE 1600 receives the release message including mobility control information, the UE 1600 may further store cell information. On the other hand, when the UE 1600 receives the release message without the mobility control information, the UE 1600 may further apply the cell information in the system information. In certain embodiments, the UE 1600 may further comprise indicate a suspension of connection establishment to upper layers, and configure lower layers to suspend an integrity protection after stopping the timer upon receiving the suspend message. In some embodiments, the actions may be delayed for 60 ms.

In certain embodiments, the UE 1600 may further, in response to stopping the timer upon performing the cell reselection procedure while the timer is running, reset MAC, release a MAC configuration, and inform upper layers of a failure of the connection establishment.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that providing a timer to protect the UE from occurring errors upon awaiting a response from the network. The timer may stop the connection establishment under certain events or a limited period of time to prevent the UE from being stuck in the connection establishment. Another advantage is that the timer may stop the UE from performing unnecessary actions upon an expiry of the connection establishment, which may further improve the efficiency of resources in the network and limit the consumption of UE battery and potential interference, While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for resuming a connection in a user equipment (UE), the method comprising:
   sending a Radio Resource Control (RRC) resume request to a network node to initiate an RRC connection resume procedure;
   starting a timer for the RRC connection resume procedure, wherein an expiration of the timer stops the RRC connection resume procedure for the UE;
   stopping the timer upon one of the following:
      the UE receiving a suspend message; and
      the UE receiving a release message; and
   in response to stopping the timer upon the UE receiving the suspend message:
      delaying, for a first period of time, actions which the UE is to execute after receiving the suspend message;
      indicating a suspension of the RRC connection resume procedure to upper layers; and
      configuring lower layers to suspend an integrity protection.

2. The method according to claim 1, further comprising, in response to stopping the timer upon the UE receiving the release message, delaying, for a first period of time, actions which the UE is to execute after receiving the release message.

3. The method according to claim 2, wherein the first period of time is 60 ms.

4. The method according to claim 1, further comprising storing cell information at the UE when the release message includes mobility control information.

5. The method according to claim 1, further comprising applying cell information in system information when the release message does not include mobility control information.

6. The method according to claim 1, wherein the first period of time is 60 ms.

7. A user equipment (UE) for resuming a connection, the UE comprising:
   processing circuitry; and
   storage that stores instructions that, when executed by the processing circuitry, cause the UE to:
      send a Radio Resource Control (RRC) resume request to a network node to initiate an RRC connection resume procedure;
      start a timer for the RRC connection resume procedure, wherein an expiration of the timer stops the RRC connection resume procedure;
      stop the timer upon one of the following:
         receiving a suspend message; and
         receiving a release message; and
      in response to stopping the timer upon receiving the suspend message:
         delay, for a first period of time, actions which the UE is to execute after receiving the suspend message;
         indicate a suspension of the RRC connection resume procedure to upper layers; and
         configure lower layers to suspend an integrity protection.

8. The UE according to claim 7, wherein the instructions further cause the UE to, in response to stopping the timer upon receiving the release message, delay, for a first period of time, actions which the UE is to execute after receiving the release message.

9. The UE according to claim 8, wherein the first period of time is 60 ms.

10. The UE according to claim 7, wherein the instructions further cause the UE to store cell information when the release message includes mobility control information.

11. The UE according to claim 7, wherein the instructions further cause the UE to apply cell information in system information when the release message does not include mobility control information.

12. The UE according to claim 7, wherein the first period of time is 60 ms.

* * * * *